United States Patent [19]
Lesher et al.

[11] 3,907,808
[45] Sept. 23, 1975

[54] 1,4-DIHYDRO-4-OXO-7-PYRIDYL-3-QUINOLINECARBOXYLIC ACID DERIVATIVES

[75] Inventors: George Y. Lesher; Philip M. Carabateas, both of Schodack, N.Y.

[73] Assignee: Sterling Drug Inc., New York, N.Y.

[22] Filed: May 3, 1973

[21] Appl. No.: 356,820

Related U.S. Application Data

[63] Continuation-in-part of Ser. No. 144,307, May 17, 1971, Pat. No. 3,753,993.

[52] U.S. Cl. ...... 260/287 R; 260/283 CN; 260/286; 260/286 R; 260/293.52; 260/295 R; 260/296 R; 260/297 R; 260/297; 424/258
[51] Int. Cl. ............................................. C07d 33/48
[58] Field of Search .................................. 260/287 R

[56] References Cited
UNITED STATES PATENTS
3,287,458  11/1966  Kaminsky ......................... 260/287
3,472,859  10/1969  Lesher ............................... 260/287
3,524,858  8/1970  Kaminsky .......................... 260/287

FOREIGN PATENTS OR APPLICATIONS
4,640,950  12/1971  Japan ................................ 260/287

*Primary Examiner*—Donald G. Daus
*Assistant Examiner*—David E. Wheeler
*Attorney, Agent, or Firm*—Robert K. Bair; B. Woodrow Wyatt

[57] ABSTRACT

1,4-Dihydro-1-(lower-alkyl)-4-oxo-5(or 6)-R'-7-pyridyl-3-quinolinecarboxylic acids and lower-alkyl esters, where R' is hydrogen, halo, lower-alkyl or lower-alkoxy and pyridyl is unsubstituted or substituted, having antibacterial activity, are prepared by reacting the corresponding 1,4-dihydro-4-oxo-7-pyridyl-3-quinolinecarboxylic acid or lower-alkyl ester with an alkylating agent, e.g., lower-alkyl halide, sulfate or sulfonate, and by other methods.

16 Claims, No Drawings

1,4-DIHYDRO-4-OXO-7-PYRIDYL-3-QUINOLINECARBOXYLIC ACID DERIVATIVES

This application is a continuation-in-part of copending U.S. Patent application Ser. No. 144,307, filed May 17, 1971, now U.S. Pat. No. 3,753,993, issued Aug. 21, 1973.

This invention relates to compositions of matter classified in the art of chemistry as 1-alkyl-1,4-dihydro-4-oxo-3-quinolinecarboxylic acids and esters, and to their preparation.

The invention in its composition aspect resides in the class of compounds which we designate 1-$R_1$-1,4-dihydro-3-(COOR)-4-oxo-5(or 6)-$R'$-7-PY-quinoline were $R_1$ is hydrogen, lower-alkyl, lower-hydroxyalkyl or lower-haloalkyl, R is hydrogen, lower-alkyl or $CH_2OAc$ where Ac is lower-alkanoyl or benzoyl, $R'$ is hydrogen, halo, lower-alkyl or lower-alkoxy, and PY is Q-1-(O)$_n$-4(3 or 2)-pyridyl, Q-1-Q'-4(3 or 2)-piperidyl or 1-(lower alkyl)-1,2-dihydro-2-oxo-4-pyridyl where $n$ is zero or one, Q is from one to four substituents selected from those given for Formula I below (i.e., $R_2$, $R_3$, $R_5$ and $R_6$) and Q' is hydrogen or lower-alkyl. The compounds of this composition aspect of the invention have antibacterial properties, as determined by standard antibacterial evaluation procedures, and thus are useful as antibacterial agents.

Without limiting the generality of the foregoing, illustrataive and preferred embodiments of our invention are the 1,4-dihydro-1-(lower-alkyl)-4-oxo-7-(4-pyridyl)-3-quinolinecarboxylic acids and esters of Formula I

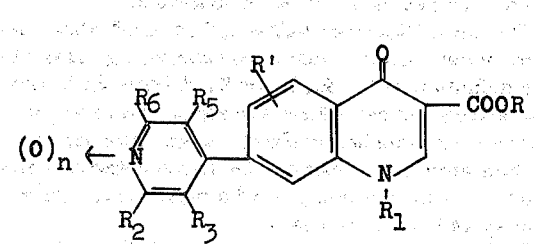

I where R is hydrogen, lower-alkyl or $CH_2OAc$ where Ac is lower-alkanoyl or benzoyl, $R_1$ is lower-alkyl, lower-hydroxyalkyl or lower-haloalkyl, $R'$ is hydrogen, halo, lower-alkyl or lower-alkoxy, $n$ is zero or 1, and, $R_2$, $R_3$, $R_5$ and $R_6$ are each selected from hydrogen, lower-alkyl, lower-alkoxy, halo, hydroxy, lower-alkanoyloxy, hydroxymethyl, aminomethyl, lower-alkanoylaminomethyl, amino, formyl, cyano, carbamyl, carboxy and lower-carbalkoxy.

Particularly disclosed and claimed in the instant application are the above designated compounds where $R'$ is other than hydrogen as designated above as well as other embodiments where $R'$ is hydrogen, for example, including the compounds where R is $CH_2OAc$.

Other of the above designated compound, particularly those where $R'$ is hydrogen and where R is other than $CH_2OAc$, are disclosed and claimed in copending U.S. Patent application, Ser. No. 144,307, now U.S. Pat. No. 3,753,993.

Disclosed and claimed herein is a compound selected from: 1-$R_1$-1,4-dihydro-3-(COOR)-4-oxo-5(or 6)-$R'$-7-PY'-quinoline where $R_1$ is lower-alkyl, R is hydrogen, lower-alkyl or $CH_2OAc$ where Ac is lower-alkanoyl or benzoyl, $R'$ is halo, lower-alkyl or lower-alkoxy or $R'$ is hydrogen when R is $CH_2OAc$, and PY is 4(or 3)-pyridyl having one to three lower-alkyl substituents or having two lower-alkyl substituents and two carboxy or lower-carbalkoxy substituents or having one lower-alkyl and one halo substituents or having one halo substituent, where lower-alkyl, lower-alkoxy, lower-alkanoyl or alkoxy of lower-carbalkoxy each has from one to six carbon atoms; and, a medicinally acceptable salt thereof. Illustrative and preferred embodiments of the instant invention are the following:

A compound of the formula I'

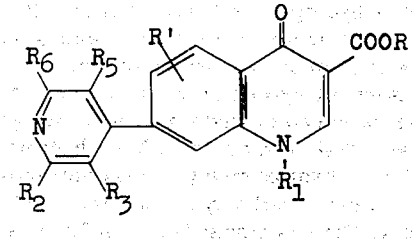

I' where $R_1$ is lower-alkyl, R is hydrogen or lower-alkyl, $R'$ is halo, lower-alkyl or lower-alkoxy, $R_2$ and $R_6$ are each loweralkyl, and, $R_3$ and $R_5$ are each carboxy or lower-carbalkoxy, where lower-alkyl, lower-alkoxy or alkoxy of lower-carbalkoxy each has from one to six carbon atoms; or a medicinally acceptable salt thereof;

A compound of the formula I''

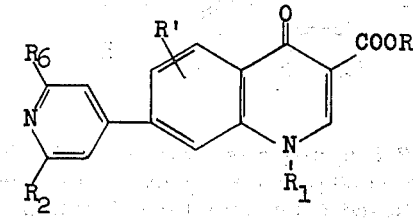

I'' where $R_1$ is lower-alkyl, R is hydrogen or lower-alkyl, $R'$ is halo, lower-alkyl or lower-alkoxy, $R_2$ is hydrogen or lower-alkyl and $R_6$ is hydrogen, lower-alkyl or halo, where lower-alkyl, lower-alkoxy or alkoxy of lower-carbalkoxy each has from one to six carbon atoms; or a medicinally acceptable salt thereof; and, A compound of the formula I'''

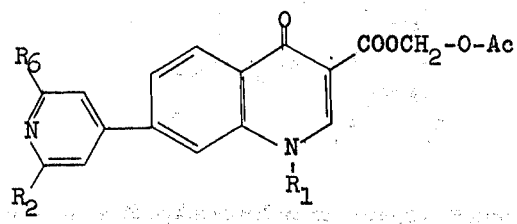

I'''

$R_1$ is lower-alkyl, $R_2$ and $R_6$ are each hydrogen or lower-alkyl, and Ac is lower-alkanoyl or benzoyl; or a medicinally acceptable salt thereof.

Particularly preferred embodiments of the instant invention are the following compounds or a medicinally acceptable salt of each: 1-ethyl-1,4-dihydro-5-methyl-4-oxo-7-(4-pyridyl)-3-quinolinecarboxylic acid; 1-ethyl-1,4-dihydro-7-(2-methyl-5-pyridyl)-4-oxo-3-quinolinecarboxylic acid; pivaloyloxymethyl 1-ethyl-1,4-dihydro-4-oxo-7-(4-pyridyl)-3-quinolinecarboxylate; benzoyloxymethyl 1-ethyl-1,4-dihydro-4-oxo-7-(4-pyridyl)-3-quinolinecarboxylate; 1-ethyl-1,4-dihydro-5-methyl-7-(2-methyl-4-pyridyl)-4-oxo-3-quinolinecarboxylic acid; 1-ethyl-1,4-dihydro-6-methyl-7-(2,6-dimethyl-4-pyridyl)-4-oxo-3-quinolinecarboxylic acid; and, 1-ethyl-7-(2-ethyl-4-pyridyl)-1,4-dihydro-4-oxo-3-quinolinecarboxylic acid.

The invention in another composition aspect resides in the class of compounds which we designate 1,4-dihydro-3-(COOR)-4-oxo-5(ot 6)-R'-7-PY-quinoline where R is hydrogen or lower-alkyl and PY is Q-1-(O)$_n$-4(3 or 2)-pyridyl, $n$ is zero or 1, and Q represents hydrogen or from one to four substituents on available carbon atoms of pyridyl other than vicinal to the 7-quinoline carbon atom, said substituents being selected from lower-alkyl, lower-alkoxy, halo, hydroxy, lower-alkanoyloxy, hydroxymethyl, lower-alkanoylamino, formyl, cyano, carbamyl, carboxy and lower-carbalkoxy. These compounds are useful as intermediates in the preparation of the corresponding 1-(lower-alkyl) compounds shown hereinabove.

Illustrative embodiments of this intermediate aspect of the invention are the compounds of formula II:

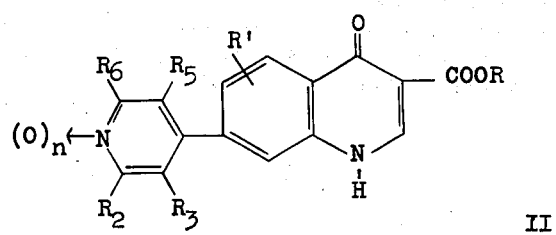

II where R is hydrogen or lower-alkyl, R' is hydrogen, halo, lower-alkyl or lower-alkoxy, $n$ is zero or 1, and, $R_2$, $R_3$, $R_5$ and $R_6$ are each selected from hydrogen, lower-alkyl, lower-alkoxy, halo, hydroxy, lower-alkanoyloxy, hydroxymethyl, lower-alkanoylaminomethyl, formyl, cyano, carbamyl, carboxy and lower-carbalkoxy.

Preferred embodiments of the intermediate aspect of the invention are the following:

A compound of the formula II'

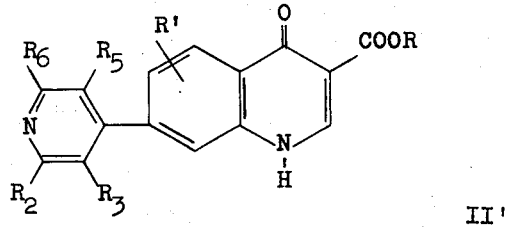

II' where R is hydrogoen or lower-alkyl, R' is halo, lower-alkyl or lower-alkoxy, $R_2$ and $R_6$ are each lower-alkyl and, $R_3$ and $R_5$ are each carboxy or lower-carbalkoxy, where lower-alkyl, lower-alkoxy or alkoxy of lower-carbalkoxy each has from one to six carbon atoms; and, A compound of the formula II''

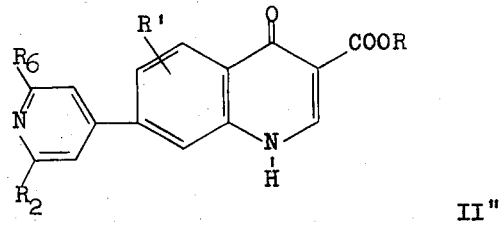

II'' where R is hydrogen or lower-alkyl, R' is halo, lower-alkyl or lower-alkoxy, $R_2$ is hydrogen or lower-alkyl and $R_6$ is hydrogen, lower-alky or halo, where lower-alkyl, lower-alkoxy or alkoxy of lower-carbalkoxy each has from one to six carbon atoms.

Each of the terms "lower-alkyl," "lower-alkoxy" and "lower-alkanoyl," as used above and throughout the specification and claims, e.g., as used in the definition of $R_2$, $R_3$, $R_5$ and $R_6$ of Formula I or, in the case of lower-alkyl, in the definition of R, $R_1$ or R', means alkyl, alkoxy or akanoyl radicals having from one to six carbon atoms which can be arranged as straight or branched chains, among which are, for purposes of illustration but without limiting the generality of the foregoing: methyl, ethyl, n-propyl, 2-butyl, isobutyl and n-hexyl for lower-alkyl; methoxy, ethoxy, n-propoxy, isopropoxy, isobutoxy, n-amoxy and n-hexoxy for lower-alkoxy; and, formyl, acetyl, propionyl (n-propanoyl), isobutyryl (2-methyl-n-propanoyl) and caproyl (n-hexanoyl) for lower-alkanoyl.

The term "lower-carbalkoxy," as used above and throughout the specification and claims, e.g., as used in the definition of $R_2$, $R_3$, $R_5$ or $R_6$ of Formula I, means carbalkoxy radicals where the alkoxy position can be straight- or branched-chained and has from one to six carbon atoms, as illustrated by carbomethoxy, carbethoxy, carbisopropoxy, carbo-n-propoxy, carbo-n-butoxy and carbo-n-hexoxy.

Each of the terms "lower-hydroxyalkyl" and "lower-haloalkyl," as used above and throughout the specification and claims, e.g., as used in the definition of $R_1$ of Formula I, means hydroxyalkyl or haloalkyl radicals having from two to six carbon atoms which can be arranged as straight or branched chains and at least two carbon atoms of which separate hydroxy or halo and the ring-nitrogen atom of the quinoline ring, among which radicals are, for purposes of illustration but without limiting the generality of the foregoing: 2-hydroxyethyl, 3-hydroxypropyl, 2-hydroxypropyl, 4-hydroxybutyl, 3-hydroxybutyl, 5-hydroxyamyl and 6-hydroxyhexyl for lower-hydroxyalkyl; and, 2-chloroethyl, 2-bromoethyl, 3-iodopropyl, 2-chloropropyl, 4-fluorobutyl, 5-iodoamyl and 6-chlorohexyl for lower-haloalkyl.

The term "halo," as used above and throughout the specification and claims, e.g., as used in the definition of Q, $R_2$, $R_3$, $R_5$, $R_6$ or R' of Formula I or in the definition of $R_1$ as lower-haloalkyl, means chloro, bromo, iodo or fluoro.

The process for producing 1-$R_1$-1,4-dihydro-3-(COOR)-4-oxo-5(or 6)-R'-7-PY-quinoline, where $R_1$ is lower-alkyl, lower-hydroxyalkyl or lower-haloalkyl, $R_1$ is hydrogen or lower-alkyl, R' is hydrogen, halo, lower-alkyl or lower-alkoxy, PY is $Q$-1-$(O)_n$-4(3 or 2)-pyridyl where n is 0 or 1 and Q is from one to four substituents selected from those given for Formula I, i.e., designated as $R_2$, $R_3$, $R_5$ and $R_6$, comprises reacting the corresponding 1,4-dihydro-3-(COOR)-4-oxo-7-PY-quinoline with a lower-alkylating agent to provide the 1-substituent, $R_1$.

The above process is further illustrated by the preparation of the preferred composition illustrated by Formula I above which comprises reacting the corresponding 1,4-dihydro-3-(COOR)-4-oxo-7-(4-pyridyl)quinoline, illustrated by Formula II

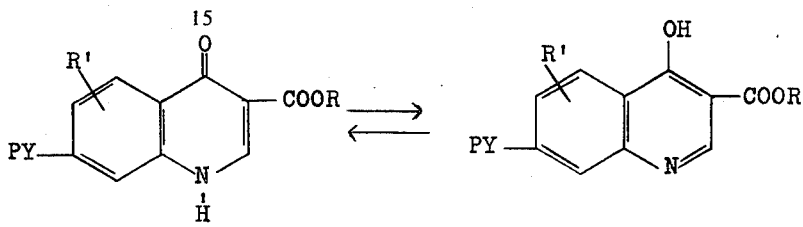

III    IIIA

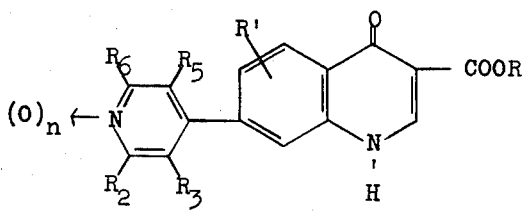

II where R, R', $R_2$, $R_3$, $R_5$, $R_6$ and n have the meanings given above for Formula I, with a lower-alkylating agent, preferably a lower-alkyl ester of a strong acid, that is, an acid which is practically completely dissociated in aqueous solution.

The preparation of the compounds where $R_1$ is lower-hydroxyalkyl or lower-haloalkyl is carried out either directly by using an alkylating agent substituted by hydroxy or halo, or stepwise, illustrated as follows. A convenient stepwise preparation of the 1-(hydroxyalkyl) compounds comprises reacting the 1,4-dihydro-3-(COOR)-4-oxo-5(or 6)-R'-7-PY-quinoline with a vinyloxyalkylating agent, e.g., vinyloxyalkyl halide, to prepare the corresponding 1-vinyloxyalkyl) compound which is then treated with an agent capable of cleaving vinyl ethers, for example, an aqueous acidic agent, e.g., aqueous acetic acid, to form the corresponding 1-(hydroxyalkyl) compound. Similarly, the 1-(haloalkyl) compound can be prepared by halogenating, for example, using an acyl halide, e.g., thionyl chloride, the corresponding 1-(hydroxyalkyl) compound.

The compounds of the invention where R is $CH_2OAc$ are prepared preferably by reacting the corresponding 1-$R_1$-1,4-dihydro-4-oxo-5(or 6)-R'-7-PY-3-quinolinecarboxylic acid, where Ac, R, R' and PY are defined hereinabove, with a halomethyl lower-alkanoate or halomethyl benzoate in the presence of an acid-acceptor, e.g., alkali bicarbonate.

The intermediate compounds, as illustrated by Formula II, exist in tautomeric forms, that is, as the 1,4-dihydro-3-(COOR)-4-oxo-7-PY-quinolines of Formula III and/or 3-(COOR)-4-hydroxy-7-PY-quinolines of Formula IIIA, illustrated as follows:

where PY is 1-$(O)_n$-2-$R_2$-3-$R_3$-5-$R_5$-6-$R_6$-4-pyridyl as shown above in Formula II where R, R', $R_2$, $R_3$, $R_5$, $R_6$ and n have the meanings given for Formula I. Measurements of the infrared spectra, in potassium bromide admixture, or in chloroform solution or mineral oil suspension, indicate existence predominantly as structure III and we have preferred to use the names based on structure III, although it is understood that either or both structures are comprehended.

Similarly, the 7-[2(or 6)-hydroxy-4(3 or 2)-pyridyl] compounds of the invention are tautomeric with corresponding 7-[1,2(or 1,6)-dihydro-2(or 6)-oxo-4(3 or 2)-pyridyl] compounds; however, as a choice of convenience, these compounds are named herein as 2-hydroxypyridyl rather than 1,2-dihydro-2-oxopyridyl compounds, even though the latter is presumed to be the predominantly existing structure. Thus, as illustrated below, the 2-hydroxy-4-pyridyl (7-substituent) structure IVA is used preferably in naming these compounds rather than the 1,2-dihydro-2-oxo-4-pyridyl structure IV, although it is understood that either or both structures are comprehended for these compounds.

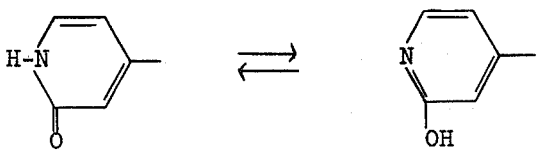

IV    IVA

The preparation of the 1-$R_1$-1,4-dihydro-3-(COOR)-4-oxo-5(or 6)-R'-7-PY-quinolines where $R_1$ is lower-alkyl, R' is hydrogen, halo, lower-alkyl or lower-alkoxy, R is hydrogen or lower-alkyl and PY is Q-1-Q'-4(3 or 2)-piperidyl where Q is from one to four substituents selected from those given above for Formula I, i.e., as $R_2$, $R_3$, $R_5$ and $R_6$, and Q' is hydrogen or lower-alkyl, is carried out by reacting the corresponding 7-[4(3 or 2)-pyridyl] or 7-[1-(lower-alkyl)-4(3 or 2)-pyridinium]

compounds with hydrogen under catalytic hydrogenation conditions using the appropriate catalyst, for example, platinum oxide.

The preparation of the 1-$R_1$-1,4-dihydro-3-(COOR)-4-oxo-5(or 6)-R'-7-[1-(lower-alkyl)-1,2-dihydro-2-oxo-4-pyridyl]quinolines where $R_1$ is lower-alkyl, R is hydrogen or lower-alkyl, and R' is hydrogen, halo, lower-alkyl or lower-alkoxy, is carried out by reacting the corresponding 7-[1-(lower-alkyl)-4-pyridinium] compounds with a mild oxidizing agent, e.g., an alkali ferricyanide.

Also with the scope of the invention are 3-carboxylic acid cationic salts of our above-described 1,4-dihydro-1-(lower-alkyl)-4-oxo-5(or 6)-R'-7-PY-3-quinolinecarboxylic acids of Formula I where R is hydrogen. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methylglucamine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using methods illustrated hereinbelow in the examples.

Our compounds where n is zero, as illustrated by the compounds of Formula I, are useful both in the free base form and in the form of acid-addition salts; and both forms are within the purview of the invention. The acid-addition salts are simply a more convenient form for use; and in practice, use of the salt form inherently amounts to use of the base form. The acids which can be used to prepare the acid-addition salts include preferably those which produce, when combined with the free base, medicinally acceptable salts, that is, salts whose anions are relatively innocuous to the animal organism in medicinal doses of the salts, so that the beneficial antibacterial properties inherent in the free base are not vitiated by side effects ascribable to the anions. In practicing our invention, we found it convenient to form the hydrochloride salts. However, other appropriate medicinally acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, acetate, citrate, tartrate, lactate, methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred, all acid-addition salts are within the scope of our invention. All acid-addition salts are useful as sources of the free base form even if the particular salt per se is desired only as an intermediate product as for example when the salt is formed only for purposes of purification or identification, or when it is used as an intermediate in preparing a medicinally acceptable salt by ion exchange procedures.

Also encompassed by our invention are quaternary-ammonium salts of the aforesaid 1,4-dihydro-1-(lower-alkyl)-3-(COOR)-4-oxo-5(or 6)-R'-7-PY-quinolines, as illustrated by the compounds of Formula I. These salts are useful for further identification of said compounds and, also, are useful as intermediates. For example, the 7-[1-(lower-alkyl)-pyridinium] salts of Formula I where n is zero are used in the preparation of the corresponding 7-[1-(lower-alkyl)-piperidyl] or 7-[1,2-dihydro-1-(lower-alkyl)-2-oxo-4-pyridyl] analogs and the 7-[1-(lower-alkoxy)-pyridinium] salts of Formula I where n is 1 are used in the preparation of the corresponding 7-[2-cyanopyridyl] compounds of Formula I where n is zero. The quaternary ammonium salts are obtained by reacting the free base form of the compound of Formula I or pyridyl-N-oxide thereof with a lower-alkyl, lower-alkenyl or benzyl ester of inorganic acids or organic sulfonic acids, including such compounds as methyl chloride, methyl bromide, methyl iodide, ethyl bromide, propyl chloride, isobutyl bromide, allyl chloride, allyl bromide, methyl sulfate, methyl benzenesulfonate, methyl p-toluenesulfonate, benzyl chloride, benzyl bromide, and the like. The quaternary ammonium salts are prepared by mixing the free base or N-oxide thereof and the lower-alkyl, lower-alkenyl or benzyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

The manner and process of making and using the instant invention will now be generally described so as to enable a person skilled in the art of chemistry to make and use the same as follows.

The process aspect of the invention is generally carried out by reacting the intermediate 1,4-dihydro-3-(COOR)-4-oxo-5(or 6)-R'-7-PY-quinoline, as illustrated by the compounds of Formula II, preferably with a lower-alkyl ester of a strong inorganic acid or an organic sulfonic acid, said ester having the formula $R_1$—An, where An is an anion of a strong inorganic acid or an organic sulfonic acid, e.g., chloride, bromide, iodide, sulfate, methanesulfonate, benzenesulfonate, and paratoluenesulfonate, and $R_1$ has the meaning given above for Formula I. The chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out in either the presence or absence of a suitable solvent, but preferably in a solvent such as lower-alkanol, acetone, dioxane, dimethylformamide, dimethyl sulfoxide, orr a mixture of solvents, e.g., a mixture of water and a lower-alkanol. The reaction is generally carried out at a temperature between about room temperature (about 25°C.) and 150°C., preferably heating on a steam bath in a stirred mixture of dimethylformamide and anhydrous potassium carbonate.

When R is lower-alkyl, i.e., when the intermediate is a lower-alkyl 1,4-dihydro-4-oxo-5(or 6)-R'-7-PY-3-quinolinecarboxylate, the reaction is conveniently carried out by heating the quinoline ester with a lower-alkyl ester of a strong acid, preferably a lower-alkyl halide, in a non-aqueous solvent, e.g., dimethylformamide, in the presence of anhydrous potassium carbonate to yield the corresponding lower-alkyl 1,4-dihydro-1-(lower-alkyl)-4-oxo-5(or 6)-R'-7-PY-3-quinolinecarboxyate. If the final product is desired in acid form, the lower-alkyl ester is readily hydrolyzed by heating it with aqueous potassium or sodium hydroxide solution to obtain the 1,4-dihydro-1-(lower-alkyl)-4-oxo-5(or 6)-R'-7-PY-3-quinolinecarboxylic acid. Alternatively, but with lower-yields, the 1,4-dihydro-4-oxo-5(or 6)-R'-7-PY-3-quinolinecarboxylic acid can be 1-alkylated directly as described above preferably using an aqueous lower-alkanol, e.g., ethanol, as the solvent and an acid-acceptor, e.g., potassium carbonate.

The above procedures can be carried out using as the alkylating agent in place of the lower-alkyl ester, $R_1$—An, the corresponding lower-hydroxyalkyl or lower-haloalkyl ester to obtain the corresponding 1-$R_1$ compounds where $R_1$ is lower-hydroxyalkyl or lower-haloalkyl. Alternatively, the 1-(lower-hydroxyalkyl) and 1-(lower-haloalkyl) compounds are prepared stepwise as described above and as illustrated hereinbelow in the specific exemplary disclosure.

The intermediate 1,4-dihydro-4-oxo-7-(4-pyridyl)-3-quinolinecarboxylic acids and lower-alkyl esters of Formula II are prepared by generally known procedures, for example, by first reacting 4-(3-amino-5-R'-phenyl)-2-$R_2$-3-$R_3$-5-$R_5$-6-$R_6$-pyridine, where R', $R_2$, $R_3$, $R_5$ and $R_6$ are defined as in Formula I but not amino or aminomethyl, with di-(lower-alkyl) ethoxymethylenemalonate to form the corresponding di-(lower-alkyl) 3-(2-$R_2$-3-$R_3$-5-$R_5$-6-$R_6$-4-pyridyl)-5-R'-anilinomethylenemalonate, which is then cyclized by heating in a suitable solvent, e.g., Dowtherm A (eutectic mixture of diphenyl and diphenyl ether) or mineral oil, to form the lower-alkyl 1,4-dihydro-4-oxo-5(or 6)-R'-7-(2-$R_2$-3-$R_3$-5-$R_5$-6-$R_6$-4-pyridyl)-3-quinolinecarboxylate which can be readily hydrolyzed to the corresponding acid by acid or alkaline hydrolysis. The 4-(3-amino-5-R'-phenyl)-2-$R_2$-3-$R_3$-5-$R_5$-6-$R_6$-pyridines are either generally known or are prepared by various methods illustrated below in the examples. The corresponding 7-[3(or 2)-pyridyl] compounds are similarly prepared.

The N-oxides of our compounds, e.g., those of Formula I, i.e., the compounds where n is one, are readily prepared by reacting the corresponding compounds where n is zero with an oxidizing agent capable of converting pyridines to pyridine N-oxides, for example, hydrogen peroxide or a per acid such as perbenzoic acid, 3-chloroperbenzoic acid, peracetic acid, trifluoroperacetic acid, performic acid, perphthalic acid, or other such oxidizing agents.

Alternatively, the final products of the invention can be prepared by a variety of procedures utilizing other 1-(lower-alkyl)-3-(COOR)-1,4-dihydro-4-oxo-5(or 6)-R'-7-PY-quinolines where R is hydrogen or lower-alkyl. Thus, the compounds of the Formula I also are useful in the preparation of other compounds of Formula I having a different meaning for one or more of $R_2$, $R_3$, $R_5$ and $R_6$. For example, these procedures are illustrated as follows in terms of the conversions effected in the 7-(4-pyridyl) substituent as follows; by reacting a 7-(4-pyridyl) N-oxide with dimethyl sulfate to form the 7-(1-methoxy-4-pyridinium) methosulfate which is reacted with an alkali cyanide, e.g., NaCN, to form the corresponding 7-(2-cyano-4-pyridyl) compound; by hydrolyzing 7-(2-cyano-4-pyridyl) with aqueous akali to form 7-(2-carboxy-4-pyridyl); by reductively alkanoylating 7-(2-cyano-4-pyridyl) to produce 7-[2-(lower-alkanoylaminomethyl)-4-pyridyl] which can be hydrolyzed to form 7-(2-aminomethyl-4-pyridyl); by reacting 7-(2,6-dimethyl-4-pyridyl) N-oxide with a lower-alkanoic acid anhydride to form 7-(2-lower-alkanoyloxymethyl-6-methyl-4-pyridyl) which can be hydrolyzed to 7-(2-hydroxymethyl-6-methyl-4-pyridyl); by reacting 7-(2-hydroxymethyl-6-pyridyl) N-oxide with lower-alkanoic acid anhydride to yield 7-[2,6-bis(lower-alkanoyloxymethyl)-4-pyridyl] which can be hydrolyzed to 7-[2,6-bis(hydroxymethyl)-4-pyridyl]; by reacting 7-(2-cyano-4-pyridyl) with polyphosphoric acid to give 7-(2-carbamyl-4-pyridyl); by reacting 7-(2-carbamyl-4-pyridyl) with lead tetraacetate and triethylamine to give 7-(2-amino-4-pyridyl); by reacting 7-(4-pyridyl) N-oxide, i.e., same as 7-(1-oxido-4-pyridyl), with a lower-alkanoic acid anhydride to form 7-[2-(lower-alkanoyloxy)-4-pyridyl] which is hydrolyzed with aqueous mineral acid, e.g., hydrochloric acid, to yield 7-(2-hydroxy-4-pyridyl); by reacting 7-(2-hydroxy-4-pyridyl) with a lower-alkylating agent, e.g., lower-diazoalkane or alkali lower-alkoxide to produce 7-[2-(lower-alkoxy)-4-pyridyl]; by halogenating 7-(2-hydroxy-4-pyridyl) to produce 7-(2-halo-4-pyridyl).

The molecular structures of the final products and intermediates of the invention are established by their mode of synthesis and confirmed by the correspondence of calculated and found values for the elementary analyses for representative examples and by infrared, ultraviolet and NMR spectral analyses.

The 1,4-dihydro-1-$R_1$-4-oxo-5(or 6)-R'-7-pyridyl-3-quinolinecarboxylic acids and lower-alkyl esters of the invention, e.g., the compounds of Formulas I, I''and I''', when tested according to standard in vitro bacteriological evaluation procedures possess antibacterial activity, for example, against organisms such as *Staphylococcus aureus*, *Pseudomonas aeruginosa*, *Klebisiella pneumoniae*, *Escherichia coli* and *Proteus vulgaris*, at concentrations in the range of about 0.01 to 250 mcg. per ml. Also, said compounds of our invention when tested according to standard in vivo bacteriological evaluation procedures in mice were found to have significant activity against bacteria, e.g., *Staphylococcus aureus*, *Escherichia coli* and *Klebsiella pneumoniae*, when administered orally and/or subcutaneously at dose levels in the range of about 3 to 200 mg. per kg. per day for 7 to 13 days.

The following examples will further illustrate the invention without, however, limiting it thereto.

1A.
1-Ethyl-1,4-dihydro-4-oxo-7-(4-pyridyl)-3-quinolinecarboxylic acid

To a stirred suspension containing 5.1 g. of 57% sodium hydride dispersed in mineral oil and 150 ml. of dimethylformamide was added in portions 32.6 g. of ethyl 1,4-dihydro-4-oxo-7-(4-pyridyl)-3-quinolinecarboxylate [tautomeric with ethyl 4-hydroxy-7-(4-pyridyl)-3-quinolinecarboxylate] followed by the addition of 18.7 g. of ethyl iodide. The resulting reaction mixture was heated on a steam bath for three hours with stirring and then concentrated in vacuo to remove the solvent. The semi-solid residue was shaken well with a mixture of chloroform and water, and a shell quantity of amorphous brown solid was filtered off. The layers were separated and the chloroform layer was evaporated in vacuo to remove the chloroform. To the oily residue containing ethyl 1-ethyl-1,4-dihydro-4-oxo-7-(4-pyridyl)-3-quinolinecarboxylate was added excess 10% aqueous sodium hydroxide solution and ethanol, and the solution was heated on a steam bath for forty-five minutes to hydrolyze the ethyl ester to the corresponding carboxylic acid. The alkaline solution was diluted to a volume of about 500 ml. with water, decolorizing charcoal was added and the mixture filtered. The filtrate was neutralized with acetic acid whereupon the carboxylic acid separated as a solid. The solid was collected and dried in a rotary evaporator. The solid was boiled with ethanol, the solution chilled and the resulting solid collected. The solid was recrystallized from dimethylformamide (about 150 ml.) using decolorizing charcoal. The filtrate was chilled, diluted with about one-half volume of ethanol and the separated crystalline product was collected, recrystallized again from dimethylformamide and dried in vacuo to yield 4.3 g. of 1-ethyl-1,4-dihydro-4-oxo-7-(4-pyridyl)-3-quinolinecarboxylic acid, m.p. 272°–273°C. Further recrystallization of this compound from dimethylformamide raised its melting point to 290°C.

The above intermediate 1,4-dihydro-4-oxo-7-(4-pyridyl)-3-quinolinecarboxylic acid was prepared in three steps starting with 4-(3-nitrophenyl)pyridine according to the procedure described below in Examples 1B, 1C and 1D.

1B. 4-(3-Aminophenyl)pyridine

A mixture containing 250 ml. of ethanol, 50 ml. of water, 13 ml. of acetic acid and 30.6 g. of iron powder was refluxed with stirring. The heat was removed and to the mixture was added in portions with stirring 35.0 g. of 4-(3-nitrophenyl)-pyridine at a rate causing the reaction mixture to reflux. After addition of the reactant had been completed, the reaction mixture was refluxed for an additional three hours. To the mixture was then added slowly 15 g. of solid sodium carbonate followed by infusorial earth. The resulting mixture was stirred for fifteen minutes and filtered while hot, washing the filtrate cake with hot ethanol. The combined filtrate and washings were concentrated in vacuo. The remaining solid was washed with water, collected and recrystallized from methanol-acetonitrile to yield 25.0 of 4-(3-aminophenyl)-pyridine, m.p. 162°–164°C.

1C. Diethyl 3-(4-pyridyl)anilinomethylenemalonate

A mixture containing 25.0 g. of 4-(3-aminophenyl)pyridine and 31.8 g. of diethyl ethoxymethylenemalonate was heated to 135°C. and held at that temperature for five minutes. Ethanol was evolved and the remaining material was diethyl 3-(4-pyridyl)anilinomethylenemalonate which was used directly in the following preparation (Example 1D). In another run of this preparation (Example 1C), a mixture containing 112 g. of 4-(3-aminophenyl)pyridine and 148 g. of diethyl ethoxymethylenemalonate was heated for eight minutes at 130°C., cooled to about 110°C. and 100 ml. of isopropyl alcohol added. The resulting solution was treated with cyclohexane until almost cloudy, treated with decolorizing charcoal, filtered and cooled. The solid that separated was collected to yield 205 g. of diethyl 3-(4-pyridyl)anilinomethylenemalonate, m.p. 86°–88°C.

1D. Ethyl 1,4-dihydro-4-oxo-7-(4-pyridyl)-3-quinolinecarboxylate

Two 250 ml. portions of Dowtherm A (eutectic mixture of diphenyl and diphenyl ether) were heated to boiling. To each was added 25 g. of diethyl 3-(4-pyridyl)-anilinomethylenemalonate and boiling was continued for twelve minutes and the reaction mixture then allowed to cool. To each cooled mixture containing crystals was added an equivalent volume of n-hexane and the crystalline material was collected, combined and washed well with ether to yield 32.6 g. of ethyl 1,4-dihydro-4-oxo-7-(4-pyridyl)-3-quinolinecarboxylate, m.p. 242°–245°C. with decomposition.

2. Ethyl 1-ethyl-1,4-dihydro-4-oxo-7-(4-pyridyl)-3-quinolinecarboxylate

To 100 g. of ethyl 1,4-dihydro-4-oxo-7-(4-pyridyl)-3-quinolinecarboxylate slurried in one liter of dimethylformamide was added 165 g. of anhydrous potassium carbonate. The mixture was warmed to 60°C. and after stirring at that temperature for fifteen minutes, 52.5 g. of diethyl sulfate was added and the resulting mixture was stirred at 60°C. for one hour. The dimethylformamide was removed in vacuo at 60°–65°C. and the residue was stirred for ten to fifteen minutes with cold water and the solid collected. The solid was taken up with a mixture of water and chloroform. The chloroform layer was separated and the chloroform evaporated in vacuo. The remaining oil was dissolved in about one liter of isopropyl alcohol, the hot solution treated with decolorizing charcoal and filtered, and the filtrate chilled. The resulting crystalline precipitate was collected to give 49 g. of ethyl 1-ethyl-1,4-dihydro-4-oxo-7-(4-pyridyl)-3-quinolinecarboxylate. A small sample of the product melted at 169°–170.5°C. after recrystallization from isopropyl alcohol and drying at room temperature.

A sample of the above ester was readily converted to the corresponding carboxylic acid by alkaline hydrolysis as follows: A mixture containing 41 g. of ethyl 1-ethyl-1,4-dihydro-4-oxo-7-(4-pyridyl)-3-quinolinecarboxylate and 400 ml. of 10% aqueous potassium hydroxide solution was vigorously stirred on a steam bath for one hour. To the hot reaction mixture was added decolorizing charcoal, the mixture filtered and the filtrate carefully acidified with glacial acetic acid to a pH of 6 and then allowed to cool. The resulting yellow solid was collected, washed with water and dried at 60°C. to yield 33 g. of 1-ethyl-1,4-dihydro-4-oxo-7-(4-pyridyl)-3-quinolinecarboxylic acid, m.p. 284°–286°C.

3.
1,4-Dihydro-4-oxo-1-n-propyl-7-(4-pyridyl)-3-quinolinecarboxylic acid A mixture containing 29.4 g. of ethyl 1,4-dihydro-4-oxo-7-(4-pyridyl)-3-quinolinecarboxylate, 300 ml. of dimethylformamide and 41.4 g. of anhydrous potassium carbonate was heated with stirring on a steam bath for fifteen minutes, cooled to 60°C., treated with 13.5 g. of n-propyl bromide and the resulting mixture kept at 60°–64°C. for three hours with stirring. The reaction mixture was concentrated in vacuo and the residue was taken up in 300 ml. of chloroform. To the chloroform solution was added 200 ml. of water; the mixture was shaken well and filtered to remove a small quantity of solid; and, the layers were then separated. The chloroform layer was washed with water, dried over anhydrous magnesium sulfate and concentrated in vacuo to remove the chloroform. The oily material containing ethyl 1,4-dihydro-4-oxo-1-n-propyl-7-(4-pyridyl)-3-quinolinecarboxylate was treated as in Example 1A using an excess of 10% aqueous sodium hydroxide solution and ethanol, and the resulting mixture was heated on a steam bath for forty-five minutes to hydrolyze the ethyl ester to the corresponding carboxylic acid. The alkaline solution was diluted as in Example 1A with water, decolorizing charcoal was added, and the mixture was filtered. The filtrate was neutralized with acetic acid whereupon the carboxylic acid precipitated. The precipitate was recrystallized twice from dimethylformamide, washed successively with cold dimethylformamide, acetonitrile and ether, and then dried in vacuo at 100°C. to yield 11.1 g. of 1,4-dihydro-4-oxo-1-n-propyl-7-(4-pyridyl)-3-quinolinecarboxylic acid, m.p. 295°–297°C. with decomposition.

4.
1,4-Dihydro-1-methyl-4-oxo-7-(4-pyridyl)-3-quinolinecarboxylic acid, 7.8 g., m.p. 329°–330°C. with decomposition, was prepared following the procedure described in Example 3 using 25.0 g. of ethyl 1,4-dihydro-4-oxo-7-(4-pyridyl)-3-quinolinecarboxylate, 250 ml. of dimethylformamide, 34.2 g. of anhydrous potassium carbonate, 10.75 g. of dimethyl sulfate and recrystallization from dimethylformamide.

5A.
1-Ethyl-1,4-dihydro-4-oxo-7-(3-pyridyl)-3-quinolinecarboxylic acid

To a vigorously stirred mixture heated on a water bath to 60°C. and containing 25.5 g. of ethyl 1,4-dihydro-4-oxo-7-(3-pyridyl)-3-quinolinecarboxylate, 250 ml. of dimethylformamide and 36.0 g. of anhydrous potassium carbonate and added 13.4 g. of diethyl sulfate. The resulting mixture was stirred at 60°C. for 30 minutes and then concentrated in vacuo to remove the dimethylformamide. The remaining solid residue was taken up in hot chloroform, the mixture filtered to remove the insoluble material and the latter washed with chloroform. The combined filtrate and chloroform washings were washed with water and the chloroform removed in vacuo. The residue containing ethyl 1-ethyl-1,4-dihydro-4-oxo-7-(3-pyridyl)-3-quinolinecarboxylate was taken up in 75 ml. of hot ethanol and to the solution was added 25 ml. of 35% aqueous sodium hydroxide solution and 25 ml. of water. The solution was heated on a steam bath for one hour and the ethanol was then allowed to evaporate. The remaining solution was diluted with an equal volume of water and the solution acidified with acetic acid. The resulting solid was collected, washed successively with water and ethanol, and recrystallized twice from dimethylformamide using decolorizing charcoal each time to yield 9.0 g. of 1-ethyl-1,4-dihydro-4-oxo-7-(3-pyridyl)-3-quinolinecarboxylic acid, m.p. 268°–269°C. with decomposition.

The above intermediate ethyl 1,4-dihydro-4-oxo-7-(3-pyridyl)-3-quinolinecarboxylate was prepared in two steps starting with 3-(3-aminophenyl)pyridine according to the procedure described below in Examples 5B and 5C.

5B. Diethyl 3-(3-pyridyl)anilinomethylenemalonate

A mixture containing 17.3 g. of 3-(3-aminophenyl)pyridine and 22.6 g. of diethyl ethoxymethylenemalonate was heated to 135° and held at that temperature for about five minutes whereupon ethanol was evolved. On cooling there crystallized diethyl 3-(3-pyridyl)anilinomethylenemalonate. A small portion of this intermediate was recrystallized from cyclohexaneisopropyl acetate using decolorizing charcoal to give the purified product melting at 84°–86°C. The remainder of the material was used directly in the following preparation (Example 5C) without any further purification.

5C. Ethyl 1,4-dihydro-4-oxo-7-(3-pyridyl)-3-quinolinecarboxylate

The diethyl 3-(3-pyridyl)anilinomethylenemalonate prepared in Example 5B was mixed with 350 ml. of Dowtherm A; the mixture was heated to boiling, boiled for twelve minutes and allowed to cool whereupon a solid crystallized. The mixture was diluted with an equal volume of ether. The solid was collected and washed with ether to yield 25.5 g. of ethyl 1,4-dihydro-4-oxo-7-(3-pyridyl)-3-quinolinecarboxylate, m.p. 253°–256°C.

6A.
1Ethyl-1,4-dihydro-7-(2,6-dimethyl-4-pyridyl)-4-oxo-3-quinolinecarboxylic acid A mixture containing 7.9 g. of ethyl 1,4-dihydro-7-(2,6-dimethyl-4-pyridyl)-4-oxo-3-quinolinecarboxylate, 70 ml. of dimethylformamide and 3.38 g. of anhydrous potassium carbonate was stirred on a steam bath for 30 minutes; 10 ml. of ethyl iodide was added; and, the reaction mixture was heated on the steam bath for three and one-half hours with stirring and then allowed to stand overnight at room temperature. The reaction mixture was concentrated in vacuo to remove the solvent and excess ethyl iodide. The remaining residue was taken up in hot chloroform, and the hot solution filtered and the filtrate evaporated in vacuo to remove the chloroform. To the semi-solid residue was added 75 ml. of 10% aqueous sodium hydroxide solution. The alkaline solution was heated on the steam bath for two hours, treated with decolorizing charcoal and filtered. The filtrate was neutralized with acetic acid, the resulting precipitate was collected, air-dried and recrystallized once from acetonitrile using decolorizing charcoal and once from dimethylformamide using decolorizing charcoal to yield 1.9 g. of 1-ethyl-1,4-dihydro-7-(2,6-dimethyl-4-pyridyl)-4-oxo-3-quinolinecarboxylic acid, m.p. 282°–284°C. with decomposition.

The above intermediate ethyl 1,4-dihydro-7-(2,6-dimethyl-4-pyridyl)-4-oxo-3-quinolinecarboxylate was prepared in two steps as described below in Examples 6B and 6C starting with 4-(3-aminophenyl)-2,6-dimethylpyridine.

6B. Diethyl 3-(2,6-dimethyl-4-pyridyl)anilinomethylenemalonate

A mixture containing 5.5 g. of 4-(3-aminophenyl)-2,6-dimethylpyridine and 6.05 g. of diethyl ethoxymethylenemalonate was heated to 135°C., held at that temperature for five minutes and then allowed to cool to yield 10.2 g. of diethyl 3-(2,6-dimethyl-4-pyridyl)anilinomethylenemalonate, which was used directly in the following preparation (Example 6C).

6C. Ethyl 1,4-dihydro-7-(2,6-dimethyl-4-pyridyl)-3-quinolinecarboxylate

To 100 ml. of an eutectic mixture of diphenyl and diphenyl ether (Dowtherm A) was added 10.2 g. of diethyl 3-(2,6-dimethyl-4-pyridyl)anilinomethylenemalonate; the mixture was boiled for twenty-five minutes and then allowed to cool. To the cooled mixture containing crystals was added an equivalent volume of n-hexane and the crystalline solid was collected and washed well with ether to yield 7.9 g. of ethyl 1,4-dihydro-7-(2,6-dimethyl-4-pyridyl)-3-quinolinecarboxylate.

7A. Ethyl 7-[3,5-bis-(ethoxycarbonyl)-2,6-dimethyl-4-pyridyl]-1-ethyl-1,4-dihydro-4-oxo-3-quinolinecarboxylate To a stirred mixture containing 12.54 g. of ethyl 7-[3,5-bis-(ethoxycarbonyl)-2,6-dimethyl-4-pyridyl]-1,4-dihydro-4-oxo-3-quinolinecarboxylate, 125 ml. of dimethylformamide and 11.51 g. of anhydrous potassium carbonate heated to 60°C. in a water bath was added dropwise over a period of about five minutes 4.63 g. of diethyl sulfate. The reaction mixture was then heated at 60°C. with stirring for one hour, allowed to cool and filtered. The filtrate was evaporated in vacuo at 60°C.; the residue was taken up in chloroform and filtered; and, the chloroform solution was washed with water, dried over anhydrous magnesium sulfate, treated with decolorizing charcoal and filtered, and the filtrate evaporated to yield an oil which crystallized. After a recrystallization from isopropyl acetate did not remove some unreacted starting material, the crystalline solid was mixed with 11.51 g. of anhydrous potassium carbonate, 125 ml. of dimethylformamide and 1 g. of diethyl sulfate and the mixture heated with stirring at 60°C. for sixty minutes and again worked up as above. After an unsuccessful purification attempt by recrystallizing the resulting crystalline solid from isopropyl acetate, it was recrystallized from ethyl acetate to yield 8.57 g. of ethyl 7-[3,5-bis(ethoxycarbonyl)-2,6-dimethyl-4-pyridyl]-1-ethyl-1,4-dihydro-4-oxo-3-quinolinecarboxylate, m.p. 179°–181°C.

The preparation of the above intermediate ethyl 7-[3,5-bis(ethoxycarbonyl)-2,6-dimethyl-4-pyridyl]-1,4-dihydro-4-oxo-3-quinolinecarboxylate was prepared in two steps starting with 4-(3-aminophenyl)-3,5-bis(ethoxycarbonyl)-2,6-dimethylpyridine according to the procedure described in Examples 7B and 7C.

7B. Diethyl 3-[3,5-bis(ethoxycarbonyl)-2,6-dimethyl-4-pyridyl]anilinomethylenemalonate A mixture containing 21.3 g. of 4-(3-aminophenyl)-3,5-bis(ethoxycarbonyl)-2,6-dimethylpyridine and 13.42 g. of diethyl ethoxymethylenemalonate was heated to 105°C. whereupon an exothermic reaction ensued raising the temperature to 125°C. The reaction mixture was then heated at 125°C. for several minutes and was allowed to cool. There was thus obtained, as an oil, 32.4 g. of diethyl 3-[3,5-bis(ethoxycarbonyl)-2,6-dimethyl-4-pyridyl]anilinomethylenemalonate, which was used directly in the following preparation (Example 7C).

7C. Ethyl 7-[3,5-bis(ethoxycarbonyl)-2,6-dimethyl-4-pyridyl]-1,4-dihydro-4-oxo-3-quinolinecarboxylate To 400 ml. of boiling Dowtherm A was added with stirring 32.4 g. of diethyl 3-[3,5-bis(ethoxycarbonyl)-2,6-dimethyl-4-pyridyl]-anilinomethylenemalonate and the resulting mixture was boiled with stirring for 25 minutes and then allowed to cool. There was added an equivalent volume of n-hexane and the mixture was cooled in an ice bath. The resulting solid was collected, washed successively with n-heptane and ether, dried, recrystallized once from acetonitrile and then recrystallized from acetone to yield 7.0 g. of ethyl 7-[3,5-bis(ethoxycarbonyl)-2,6-dimethyl-4-pyridyl]-1,4-dihydro-4-oxo-3-quinolinecarboxylate, m.p. 235°–239°C. A second crop of 2.68 g. of this compound, m.p. 230°–235°C., was also obtained.

8A. Ethyl 1-ethyl-1,4-dihydro-7-(2-methyl-4-pyridyl)-4-oxo-3-quinolinecarboxylate A mixture containing 19.5 g. of ethyl 1,4-dihydro-7-(2-methyl-4-pyridyl)-4-oxo-3-quinolinecarboxylate, 200 ml. of dimethylformamide and 26.3 g. of anhydrous potassium carbonate was heated to 60°C. in a water bath with stirring and to the stirred mixture kept at 60°C. was added over a period of about five minutes 10.74 g. of diethyl sulfate. The reaction mixture was stirred at the same temperature for two and one-half hours and then evaporated in vacuo. The residue was taken up in a mixture of chloroform and water; the chloroform layer was separated, dried over anhydrous magnesium sulfate, treated with decolorizing charcoal and filtered; and, the filtrate was evaporated to remove the chloroform. The residual semi-solid solidified by triturating with ether. The solid was purified by recrystallization from acetonitrile, a second recrystallization from methyl isobutyl ketone and then dissolving it in methylene dichloride, treating with decolorizing charcoal and filtering, repeating the charcoaling, and then evaporating the resulting yellow filtrate to yield 5.46 g. of ethyl 1-ethyl-1,4-dihydro-7-(2-methyl-4-pyridyl)-4-oxo-3-quinolinecarboxylate, m,pl 185°–188°C.

The above intermediate ethyl 1,4-dihydro-7-(2-methyl-4-pyridyl)-4-oxo-3-quinolinecarboxylate was prepared in seven steps starting with 2,6-dimethyl-4-(3-nitrophenyl)pyridine as described hereinbelow in Examples 8C–8I.

The above product of Example 8A was readily converted into the corresponding 3-quinolinecarboxylic acid as described in Example 8B.

8B. 1-Ethyl-1,4-dihydro-7-(2-methyl-4-pyridyl)-4-oxo-3-quinolinecarboxylic acid A mixture containing 7.99 g. of ethyl 1-ethyl-1,4-dihydro-7-(2-methyl-4-pyridyl)-4-oxo-3-quinolinecarboxylate, 100 ml. of water and 30 ml. of concentrated hydrochloric acid was heated to reflux with stirring and was stirred at reflux for thirty minutes. The hot reaction mixture was filtered whereupon needles shortly began to separate. The mixture was evaporated in vacuo to a small volume and the solid was collected. The solid was recrystallized from methanol (about 1500 ml.), adding ether to the warm filtrate until slight clouding, and then allowing the solution to cool. The crystalline product was collected to yield 6.26 g. of 1-ethyl-1,4-dihydro-7-(2-methyl-4-pyridyl)-4-oxo-3-quinolinecarboxylic acid, as its hydrochloride, m.p. 302°–303°C. with decomposition.

8C. 2,6-Dimethyl-4-(3-nitrophenyl)pyridine N-oxide

To a stirred mixture containing 34.0 g. of 2,6-dimethyl-4-(3-nitrophenyl)pyridine and 149 ml. of acetic acid was added 45 ml. of 30% hydrogen peroxide and the resulting reaction mixture was heated on a steam bath for three hours and then allowed to cool whereupon the crystalline product separated. The mixture was diluted with water; the precipitate was collected, washed with water and dried to yield 38.3 g. of 2,6-dimethyl-4-(3-nitrophenyl)pyridine N-oxide, m.p. 235°–238°C.

8D. 6-Methyl-4-(3-nitrophenyl)pyridine-2-methanol

A 157 ml. portion of acetic anhydride was heated to reflux, the heat removed, and to the hot anhydride was slowly added with stirring 38.3 g. of 2,6-dimethyl-4-(3-nitrophenyl)pyridine N-oxide. The reaction mixture was refluxed for 30 minutes and then allowed to cool. Ethanol was added to decompose the excess acetic anhydride and the material was evaporated in vacuo. The remaining oil containing 2-acetoxymethyl-6-methyl-4-(3-nitrophenyl)pyridine was refluxed for one hour with 160 ml. of concentrated hydrochloric acid and the mixture evaporated in vacuo. The residue was taken up in water and the resulting solution was treated with decolorizing charcoal and filtered. The charcoal treatment was repeated another two times. The filtrate was made basic with concentrated ammonium hydroxide. The yellow precipitate was collected, washed with water and recrystallized from 1:1 methanol:water (about three liters) using decolorizing charcoal, washed with water and dried to yield 21.0 g. of 6-methyl-4-(3-nitrophenyl)pyridine-2-methanol, m.p. 152°–155°C.

8E. 6Methyl-4-(3-nitrophenyl)pyridine-2-aldehyde

A mixture containing 21.0 g. of 6-methyl-4-(3-nitrophenyl)pyridine-2-methanol, 520 ml. of chloroform and 41.7 g. of activated manganese dioxide was refluxed with stirring having a continuous water separator attached to the reaction vessel. After six hours of refluxing, the theoretical quantity of water had been collected. The reaction mixture was filtered while hot and the filter cake was washed with 400 ml. of hot chloroform. The combined filtrate and washings were treated with decolorizing charcoal, the mixture filtered, and the filtrate evaporated to yield a solid which was then recrystallized from acetone (about two liters) using decolorizing charcoal to yield 15.9 g. of 6-methyl-4-(3-nitrophenyl)pyridine-2-aldehyde, m.p. 193°–195°C.

8F. 2-Methyl-4-(3-nitrophenyl)pyridine

A stirred mixture containing 18.9 g. of 6-methyl-4-(3-nitrophenyl)pyridine-2-aldehyde, 150 ml. of Dowtherm A and 1.89 g. of 10% palladium-on-charcoal was flushed with nitrogen and heated whereupon there was rapid gas evolution at 150°C. The mixture was then heated with stirring to 190°C. and kept at that temperature for twenty minutes until the evolution of gas ceased. The reaction mixture was allowed to cool, it was then diluted with benzene and the mixture was filtered. The filtrate was extracted with 3N hydrochloric acid, the acidic extract was extracted with benzene and the benzene extract was discarded. The acidic solution was treated with decolorizing charcoal and filtered. The filtrate was made basic with concentrated ammonium hydroxide solution and the white solid that separated was extracted with chloroform. The chloroform extract was dried over anhydrous magnesium sulfate, treated with decolorizing charcoal, filtered, and the filtrate evaporated in vacuo and the solid residue dried in a vacuum oven to yield 4.30 g. of 2-methyl-4-(3-nitrophenyl)pyridine.

8G. 4-(3-Aminophenyl)-2-methylpyridine

A mixture containing 15.7 g. of 2-methyl-4-(3-nitrophenyl)pyridine, 600 ml. of dimethylformamide and 0.59 g. of 10% palladium-on-charcoal was hydrogenated under pressure, the theoretical quantity of hydrogen being consumed in about one hour. The reaction mixture was filtered and the filtrate evaporated. The crystalline residue was taken up in methanol; the methanol solution was treated with decolorizing charcoal and filtered; and the filtrate was evaporated to yield 13.0 g. of 4-(3-aminophenyl)-2-methylpyridine, m.p. 105°–111°C.

8H. Diethyl 3-(2-methyl-4-pyridyl)anilinomethylenemalonate

A mixture containing 14.9 g. of 4-(3-aminophenyl)-2-methylpyridine and 17.7 g. of diethyl ethoxymethylenemalonate was heated to about 100°C. whereupon an exothermic reaction ensued and the heat source was removed. When the temperature fell again to 100°C., the reaction mixture was heated and the temperature kept between 115°–125°C. for about five minutes. On cooling there was obtained, as an oil, diethyl 3-(2-methyl-4-pyridyl)anilinomethylenemalonate which was used directly in Example 8I.

8I. Ethyl 1,4-dihydro-7-(2-methyl-4-pyridyl)-4-oxo-3-quinolinecarboxylate

To 300 ml. Dowtherm A was added the product of Example 8H and boiling was continued for 12 minutes. The reaction mixture was then cooled, diluted with an equivalent volume of n-hexane, and the precipitate was collected and washed well with ether to yield 21.8 g. of ethyl 1,4-dihydro-7-(2-methyl-4-pyridyl)-4-oxo-3-quinolinecarboxylate.

9. 1-Ethyl-1,4-dihdyro-4-oxo-7-(4-pyridyl)-3-quinolinecarboxylic acid N-oxide A mixture containing 8.3 g. of 1-ethyl-1,4-dihydro-4-oxo-7-(4-pyridyl)-3-quinolinecarboxylic acid, 100 ml. of acetic anhydride and 30% hydrogen peroxide was heated on a steam bath for three hours and then concentrated in vacuo. The remaining solid was boiled with 100 ml. of dimethylformamide and allowed to stand until cold. The solid was collected and washed successively with dimethylformamide and acetonitrile to yield 7.0 g. of 1-ethyl-1,4-dihdyro-4-oxo-7-(4-pyridyl)-3-quinolinecarboxylic acid N-oxide, m.p. 301°–302°C. This product was combined with a 3.1 g. portion of the same product prepared in the same way and was purified further as follows: The 10.1 g. of product was dissolved in 60 ml. of hot formic acid and the hot solution was filtered through a sintered glass funnel. The filtrate was diluted to 200 ml. with acetonitrile whereupon the product separated as white crystalline needles which were collected and dried in a vacuum oven at 80°C. to yield 3.5 g. of 1-ethyl-1,4-dihydro-4-oxo-7-(4-pyridyl)-3-quinolinecarboxylic acid N-oxide, m.p. 307°–309°C. with decomposition.

10. Ethyl 1-ethyl-1,4-dihydro-4-oxo-7-(4-pyridyl)-3-quinolinecarboxylate N-oxide A mixture containing 18.0 g. of ethyl 1-ethyl-1,4-dihydro-4-oxo-7-(4-pyridyl)-3-quinoline-carboxylate, 12.2 g. of 85% 3-chloroperbenzoic acid and 250 ml. of methylene dichloride was stirred for two hours at room temperature. The reaction mixture was concentrated in vacuo and the remaining solid was boiled with a mixture of 25 ml. of dimethylformamide in 100 ml. of methanol for five minutes and then allowed to stand overnight. The crystalline solid was collected and then stirred with a warm solution containing sodium bicarbonate. The white solid was collected, washed with water, air-dried and then dried in vacuo to yield 11.5 g. of ethyl 1-ethyl-1,4-dihydro-4-oxo-7-(4-pyridyl)-3-quinolinecarboxylate N-oxide, m.p. 216°–218°C.

11. Ethyl 7-(2-cyano-4-pyridyl)-1-ethyl-1,4-dihydro-4-oxo-3-quinolinecarboxylate A mixture containing 9.2 g. of ethyl 1-ethyl-1,4-dihydro-4-oxo-7-(4-pyridyl)-3-quinolinecarboxylate N-oxide, 6.3 g. of dimethyl sulfate and 25 ml. of acetonitrile was heated to reflux with stirring. Another 2 g. of dimethyl sulfate was added and refluxing was continued for another 35 minutes. The reaction mixture was chilled and the solid was collected, washed with acetonitrile and dried in vacuo. The solid, 4-(3-carbethoxy-1-ethyl-1,4-dihydro-4-oxo-7-quinolyl)-N-methoxypyridinium methosulfate, was suspended in 75 ml. of water and to this stirred suspension was added 9.75 g. of potassium cyanide in 50 ml. of water. On standing there separated as a white solid, ethyl 7-(2-cyano-1,2-dihydro-1-methoxy-4-pyridyl)-1-ethyl-1,4-dihydro-4-oxo-3-quinolinecarboxylate, which was collected and washed with water. The solid was slurried with ethanol and the mixture concentrated in vacuo. The residue was boiled with 300 ml. of acetonitrile and chilled. The solid that separated was recrystallized from dimethylformamide-acetonitrile to yield 7.0 g. of ethyl 7-(2-cyano-4-pyridyl)-1-ethyl-1,4-dihydro-4-oxo-3-quinolinecarboxylate, m.p. 253°–256°C. Recrystallization again from the same solvents raised the melting point to 258°–261°C.

12. 7-(2-Carboxy-4-pyridyl)-1-ethyl-1,4-dihydro-4-oxo-3-quinolinecarboxylic acid A mixture containing 7.0 g. of ethyl 7-(2-cyano-4-pyridyl)-1-ethyl-1,4-dihydro-4-oxo-3-quinolinecarboxylate, 20 ml. of 10% aqueous sodium hydroxide solution and 30 ml. of water was heated on a steam bath with stirring for 30 minutes and then refluxed for ninety minutes. The reaction mixture was diluted with an equal volume of water and filtered. The filtrate was acidified with acetic acid and the separated solid was collected, washed with water and air-dried. The solid was boiled with 50 ml. of acetic acid, the mixture cooled and the solid collected. The solid was recrystallized from dimethylformamide to yield 5.3 g. of the desired product containing some unreacted starting material. This solid was dissolved in 50 ml. of 5% aqueous sodium hydroxide solution and the resulting solution was refluxed for one hour and filtered. To the filtrate was added dilute hydrochloric acid; the separated solid was collected and washed with water. The moist solid was dissolved in about 75 ml. of dimethylformamide; the solution was heated to boil off the water and filtered; and, to the filtrate was added an equal volume of ethanol. The separated solid was collected and, when found to contain dimethylformamide, was dissolved in dilute ammonium hydroxide. The basic solution was filtered and to the filtrate was added dilute hydrochloric acid. The separated white solid was collected and dried in vacuo to yield 4.0 g. of 7-(2-carboxy-4-pyridyl)-1-ethyl-1,4-dihydro-4-oxo-3-carboxylic acid, m.p. 246°–247°C. with decomposition.

13. Ethyl 1-ethyl-1,4-dihydro-7-(2,6-dimethyl-4-pyridyl)-4-oxo-3-quinolinecarboxylate N-oxide A mixture containing 23.8 g. of ethyl 1-ethyl-1,4-dihydro-7-(2,6-dimethyl-4-pyridyl)-4-oxo-3-quinolinecarboxylate, 300 ml. of methylene dichloride and 15.2 g. of 85% 3-chloroperbenzoic acid was stirred at room temperature to give a clear solution which was allowed to stand for five hours. The solvent was then allowed to evaporate over the weekend. The remaining solid was washed with ether, recrystallized from a small quantity of dimethylformamide, washed successively with acetonitrile and ether, and dissolved in hot chloroform. The hot chloroform solution was treated with decolorizing charcoal, the mixture filtered, the filtrate concentrated in vacuo, and the remaining solid recrystallized from dimethylformamide to yield 15.8 g. of ethyl 1-ethyl-1,4-dihydro-7-(2,6-dimethyl-4-pyridyl)-4-oxo-3-quinolinecarboxylate N-oxide, m.p. 225°–230°C.

14. 1-Ethyl-1,4-dihydro-7-(2,6-dimethyl-4-pyridyl)-4-oxo-3-quinolinecarboxylic acid N-oxide A mixture containing 7.3 g. of ethyl 1-ethyl-1,4-dihydro-7-(2,6-dimethyl-4-pyridyl)-4-oxo-3-quinolinecarboxylate N-oxide, 50 ml. of water and 10 ml. of concentrated hydrochloric acid was refluxed with stirring for thirty minutes. After about ten minutes of refluxing a crystalline solid separated. The hot reaction mixture was cooled, the solid collected and washed with water. The solid was treated with 1600 ml. of boiling methanol and the hot solution was filtered. The filtrate was concentrated to a volume of 800 ml. which was chilled. The separated solid was collected, recrystallized from dimethylformamide and dried at 100°C. to yield 3.8 g. of 1-ethyl-1,4-dihydro-7-(2,6-dimethyl-4-pyridyl)-4-oxo-3-quinolinecarboxylic acid N-oxide, m.p. 295°–296°C. with decomposition.

15.
1-Ethyl-1,4-dihydro-7-(2-hydroxymethyl-6-methyl-4-pyridyl)-4-oxo-3-quinolinecarboxylic acid A 30 ml. portion of acetic anhydride was heated to reflux, the heat removed and 10.0 g. of ethyl 1-ethyl-1,4-dihydro-7-(2,6-dimethyl-4-pyridyl)-4-oxo-3-quinolinecarboxylate N-oxide was added in portions with stirring. The reaction mixture was then refluxed for 30 minutes, cooled and then concentrated in vacuo. To the residue was added 20 ml. of methanol which was then removed in vacuo. To the residue containing ethyl 7-(2-acetoxymethyl-6-methyl-4-pyridyl)-1-ethyl-1,4-dihydro-4-oxo-3-quinolinecarboxylate was added 50 ml. of 6N hydrochloric acid, the solution was refluxed for one hour, allowed to cool and concentrated in vacuo. The gummy residue was solidified by trituration with hot ethanol. The solid was taken up in water, the aqueous solution treated with decolorizing charcoal and filtered. To the filtrate was added an aqueous solution of sodium acetate. The resulting solid was collected, washed with water, air-dried and dissolved in 400 ml. of boiling ethanol. The hot ethanol solution was treated with decolorizing charcoal and filtered. The filtrate was concentrated to a volume of about 250 ml. and then chilled. The resulting precipitate was collected and recrystallized successively from acetonitrile (about 300 ml.) using decolorizing charcoal, methanol (about 500 ml.) and then acetonitrile to yield 0.8 g. of 1-ethyl-1,4-dihydro-7-(2-hydroxymethyl-6-methyl-4-pyridyl)-4-oxo-3-quinolinecarboxylic acid, m.p. 250°–251°C. with decomposition.

16. Ethyl 7-(2-acetamidomethyl-4-pyridyl)-1-ethyl-1,4-dihydro-4-oxo-3-quinolinecarboxylate A mixture containing 3.47 g. of ethyl 7-(2-cyano-4-pyridyl)-1-ethyl-1,4-dihydro-4-oxo-3-quinolinecarboxylate, 100 ml. of acetic anhydride, 2 g. of anhydrous sodium acetate and about one-quarter of a teaspoon of Raney nickel was treated under pressure with hydrogen in a Parr shaker for eight hours at 50°C. The reaction mixture was filtered and the filtrate concentrated in vacuo. The solid residue was washed with water and extracted with hot dimethylformamide. The dimethylformamide extract was concentrated in vacuo to yield a solid. The solid was recrystallized from ethanol and dried in vacuo to yield 2.2 g. of ethyl 7-(2-acetamidomethyl-4-pyridyl)-1-ethyl-1,4-dihydro-4-oxo-3-quinolinecarboxylate, m.p. 197°–199°C.

17A.
1-Ethyl-1,4-dihydro-4-oxo-7-(2-pyridyl)-3-quinolinecarboxylic acid, 14.0 g., m.p. 239°–241°C., was prepared following the procedure described in Example 3 using 40.4 g. of ethyl 1,4-dihydro-4-oxo-7-(2-pyridyl)-3-quinolinecarboxylate, 55 g. of anhydrous potassium carbonate, 400 ml. of dimethylformamide and 21.2 g. of diethyl sulfate to yield first ethyl 1-ethyl-1,4-dihydro-4-oxo-7-(2-pyridyl)-3-quinolinecarboxylate which was then hydrolyzed with 50 ml. of 10% aqueous sodium hydroxide solution and the mixture acidified with acetic acid as in Example 3 to yield the corresponding 3-quinolinecarboxylic acid which was recrystallized first from isopropyl alcohol, next from about 800 ml. of acetonitrile and finally from dimethylformamide (50 ml.)-acetonitrile(200 ml.), and dried at 100°C. in vacuo.

The above intermediate ethyl 1,4-dihydro-4-oxo-7-(2-pyridyl)-3-quinolinecarboxylate was prepared in two steps starting with 2-(3-aminophenyl)pyridine according to the procedure described below in Examples 17B and 17C. The corresponding 1,4-dihydro-4-oxo-7-(2-pyridyl)-3-quinolinecarboxylic acid was prepared by hydrolysis of the corresponding ethyl ester as described in Example 17D.

17B. Diethyl 3-(2-pyridyl)anilinomethylenemalonate was prepared as in Example 1C using 38.1 g. of 2-(3-aminophenyl)pyridine and 48.5 g. of diethyl ethoxymethylenemalonate.

17C. Ethyl 1,4-dihydro-4-oxo-7-(2-pyridyl)-3-quinolinecarboxylate 41.3 g., was prepared following the procedure described in Example 1D using the diethyl 3-(2-pyridyl)anilinomethylenemalonate prepared in Example 17B and 700 ml. of Dowtherm A.

17D.
1,4-Dihydro-4-oxo-7-(2-pyridyl)-3-quinolinecarboxylic acid

A mixture containing 10.3 g. of ethyl 1,4-dihydro-4-oxo-7-(2-pyridyl)-3-quinolinecarboxylate and 100 ml. of 10% aqueous potassium hydroxide solution was stirred on a steam bath for about thirty minutes, treated with decolorizing charcoal and filtered. The filtrate was acidified with acetic acid, the separated solid was collected, washed successively with water and ethanol and then recrystallized several times from dimethylformamide and dried in a vacuum oven at 100°C. to yield 5.4 g. of 1,4-dihydro-4-oxo-7-(2-pyridyl)-3-quinolinecarboxylic acid, m.p. 273°–274°C. with decomposition.

18.
1-Ethyl-1,4-dihydro-4-oxo-7-(4-pyridyl)-3-quinolinecarboxylic acid methochloride A mixture containing 16.2 g. of ethyl 1-ethyl-1,4-dihydro-4-oxo-7-(4-pyridyl)-3-quinolinecarboxylate and 250 ml. of acetonitrile was refluxed with stirring to effect dissolution and to the hot solution was added with stirring 20 ml. of methyl iodide. The mixture was refluxed with stirring for thirty minutes and then concentrated in vacuo. The solid residue was taken up in warm water (about 300 ml.) and passed through a column (2 × 30 cm.) of an ion exchange resin supplying chloride ions (IRA-400) and eluting the column with methanol. The methanol filtrate was concentrated in vacuo and the remaining solvent was treated with 125 ml. of absolute ethanol and 125 ml. 6N hydrochloric acid. The resulting mixture was refluxed for four hours and then concentrated in vacuo. The solid residue was recrystallized from water using decolorizing charcoal, dried in vacuo, and boiled with 100 ml. of dimethylformamide to remove some yellow color. After drying the remaining crystalline solid in vacuo, there was obtained 13.3 g. of 1-ethyl- 1,4-dihydro-4-oxo-7-(4-pyridyl)-3-quinolinecarboxylic acid methochloride, m.p. 282°–284°C. Alternatively, this compound can be named as 4-(3-carboxy-1-ethyl-1,4-dihydro-4-oxo-7-quinolyl)-1-methylpyridinium chloride.

19. Ethyl 1-ethyl-1,4-dihydro-4-oxo-7-(4-pyridyl)-3-quinolinecarboxylate methiodide A mixture containing 9.66 g. of ethyl ethyl-1,4-dihydro-4-oxo-7-(4-pyridyl)-3-quinolinecarboxylate and 150 ml. of acetonitrile was refluxed with stirring and to the resulting clear solution was added 10 ml. of methyl iodide. The resulting reaction mixture was refluxed with stirring for one hour and cooled. The separated solid was collected, recrystallized from water (about 60 ml.), washed successively with ethanol and ether, and dried in vacuo to yield 13.3 g. of ethyl 1-ethyl-1,4-dihydro-4-oxo-7-(4-pyridyl)-3-quinolinecarboxylate methiodide, m.p. 270°–272°C. with decomposition, alternatively named as 4-(3-carbethoxy-1-ethyl-1,4-dihydro-4-oxo-7-quinolyl)-1-methylpyridinium iodide.

Following the procedure described in Example 19 but using in place of methyl iodide the corresponding molar equivalent quantity each of ethyl iodide, allyl bromide or benzyl chloride, there is obtained the corresponding 4-(3-carbethoxy-1-ethyl-1,4-dihydro-4-oxo-7-quinolyl)-1-ethylpyridinium iodide, -1-allylpyridinium bromide or -1-benzylpyridinium chloride.

20A. Ethyl 1-ethyl-1,4-dihydro-7-(1-methyl-4-piperidyl)-4-oxo-3-quinolinecarboxylate A mixture containing 4.64 g. of ethyl 1-ethyl-1,4-dihydro-4-oxo-7-(4-pyridyl)-3-quinolinecarboxylate methiodide, 200 mg. of platinum oxide and 90 ml. of dimethylformamide was treated under catalytic hydrogenation conditions at 70°C. for five hours using an initial hydrogen pressure of 620 p.s.i. The reaction mixture was filtered to remove the catalyst and the filtrate concentrated in vacuo to remove the solvent. The residue was taken up in about 50 ml. of water and the aqueous solution was made basic with ammonium hydroxide. The separated oil was extracted with methylene dichloride. The extract was dried over anhydrous magnesium sulfate and the methylene dichloride was allowed to evaporate. The remaining oil which crystallized on scratching with a glass rod was recrystallized once from ethyl acetate and once from acetonitrile to yield 1.0 g. of ethyl 1-ethyl-1,4-dihydro-7-(1-methyl-4-piperidyl)-4-oxo-3-quinolinecarboxylate, m.p. 179°–181°C.

The above preparation was repeated using 12.9 g. of ethyl 1-ethyl-1,4-dihydro-4-oxo-7-(4-pyridyl)-3-quinolinecarboxylate methiodide, 500 mg. of platinum oxide and 300 ml. of dimethylformamide to yield 3.2 g. of ethyl 1-ethyl-1,4-dihydro-7-(1-methyl-4-piperidyl)-4-oxo-3-quinolinecarboxylate, m.p. 181°–183°C.

20B. 1-Ethyl-1,4-dihydro-7-(1-methyl-4-piperidyl)-4-oxo-3-quinolinecarboxylic acid A mixture containing 4.2 g. of ethyl 1-ethyl-1,4-dihydro-7-(1-methyl-4-piperidyl)-4-oxo-3-quinolinecarboxylate and 50 ml. of 6N hydrochloric acid was refluxed for one hour and then allowed to stand overnight at room temperature. The reaction mixture was concentrated in vacuo and the remaining solid was triturated with isopropyl alcohol, collected and then recrystallized from 95% ethanol to yield 2.7 g. of 1-ethyl-1,4-dihydro-7-(1-methyl-4-piperidyl)-4-oxo-3-quinolinecarboxylic acid, as its hydrochloride, m.p. 290°–292°C. with decomposition.

21. 1-Ethyl-1,4-dihydro-4-oxo-7-(4-piperidyl)-3-quinolinecarboxylic acid

A mixture containing 16.1 g. of ethyl 1-ethyl-1,4-dihydro-4-oxo-7-(4-pyridyl)-3-quinolinecarboxylate, 125 ml. of absolute ethanol, 3 ml. of acetic acid and 150 mg. of platinum oxide was treated under catalytic hydrogenation conditions at 65°C. for five hours using an initial pressure of 500 p.s.i. The reaction mixture was filtered to remove the catalyst; the filtrate was concentrated to a volume of 50 ml. and to it was added a mixture containing 20 ml. of concentrated hydrochloric acid and 75 ml. of water whereupon a solid separated. The mixture was refluxed with stirring for three hours and the reaction mixture chilled. The solid that separated was filtered off and the filtrate was concentrated to remove the solvent. The remaining gummy material was boiled with isopropyl alcohol to yield a solid which was recrystallized from methanol to yield 5.2 g. of 1-ethyl-1,4-dihydro-4-oxo-7-(4-piperidyl)-3-quinolinecarboxylic acid, m.p. 303°–306°C.

22A. Ethyl 1,4-dihydro-1-(2-hydroxyethyl)-4-oxo-7-(4-pyridyl)-3-quinolinecarboxylate To a warm solution containing 26.2 g. of ethyl 1,4-dihydro-4-oxo-7-(4-pyridyl)-1-(2-vinyloxyethyl)-3-quinolinecarboxylate in 50 ml. of acetic acid was added 5 ml. of water and the reaction solution was heated on a steam bath for one hour. The reaction solution was concentrated in vacuo to remove the liquids; the remaining solid was suspended in water and the solid was collected. The solid was recrystallized from dimethylformamide and dried to yield 18.0 g. of ethyl 1,4-dihydro-1-(2-hydroxyethyl)-4-oxo-7-(4-pyridyl)-3-quinolinecarboxylate, m.p. 154°–156°C.

The above intermediate ethyl 1,4-dihydro-4-oxo-7-(4-pyridyl)-1-(2-vinyloxyethyl)-3-quinolinecarboxylate was prepared as described in Example 22B.

22B. Ethyl 1,4-dihydro-4-oxo-7-(4-pyridyl)-1-(2-vinyloxyethyl)-3-quinolinecarboxylate A mixture containing 37 g. of ethyl 1,4-dihydro-4-oxo-7-(4-pyridyl)-3-quinolinecarboxylate, 28.0 g. of anhydrous potassium carbonate and 250 ml. of dimethylformamide was stirred on a steam bath for one hour. To the stirred mixture was added 13.8 g. of 2-vinyloxyethyl chloride and the resulting reaction mixture was heated on a steam bath with stirring for three and one-half hours and filtered while hot. The filtrate was chilled and the solid that separated was collected, recrystallized twice from dimethylformamide, washed with ethanol, and dried in vacuo at 80°C. to yield 26.2 g. of ethyl 1,4-dihydro-4-oxo-7-(4-pyridyl)-1-(2--vinyloxyethyl)-3-quinolinecarboxylate, m.p. 190°–192°C.

23.
1,4-Dihydro-1-(2-hydroxyethyl)-4-oxo-7-(4-pyridyl)-3-quinolinecarboxylic acid A mixture containing 4.2 g. of ethyl 1,4-dihydro-1-(2-hydroxyethyl)-4-oxo-7-(4-pyridyl)-3-quinolinecarboxylate, 15 ml. of 10% aqueous potassium hydroxide solution and 15 ml. of water was heated on a steam bath for two hours and filtered. To the filtrate was added sufficient hydrochloric acid to produce a pH of about 6.2; the mixture was digested on the steam bath and the solid was collected; and, the solid was washed successively with water, ethanol, dried, recrystallized from a small volume of dimethylformamide and dried to yield 2.63 g. of 1,4-dihydro-1-(2-hydroxyethyl)-4-oxo-7-(4-pyridyl)-3-quinolinecarboxylic acid, m.p. 285°–287°C.

24. Ethyl 1-(2-chloroethyl)-1,4-dihydro-4-oxo-7-(4-pyridyl)-3-quinolinecarboxylate To a rapidly stirred suspension of 15.0 g. of ethyl 1,4-dihydro-1-(2-hydroxyethyl)-4-oxo-7-(4-pyridyl)-3-quinolinecarboxylate in 800 ml. of chloroform was added 17 ml. of thionyl chloirde. The mixture was refluxed for five hours with stirring; during this period an initially formed tar disappeared and a solid separated. This solid was collected, washed with chloroform, and dried to obtain 17.0 g. of ethyl 1-(2-chloroethyl)-1,4-dihydro-4-oxo-7-(4-pyridyl)-3-quinolinecarboxylate as its hydrochloride salt. This was suspended in water and the resulting gel-like mixture was approximately neutralized using 10% KOH. The mixture was heated on the steam bath while adjusting the pH to about 7 to 7.5 and then filtered while hot. The (damp) filter cake was recrystallized twice from ethanol to give, after drying, 11.4 g. of ethyl 1-(2-chloroethyl)-1,4-dihydro-4-oxo-7-(4-pyridyl)-3-quinolinecarboxylate as a cream solid of uncertain melting point.

25.
1-(2-Chloroethyl)-1,4-dihydro-4-oxo-7-(4-pyridyl)-3-quinolinecarboxylic acid A mixture containing 11.2 g. of ethyl 1-(2-chloroethyl)-1,4-dihydro-4-oxo-7-(4-pyridyl)-3-quinolinecarboxylate, 200 ml. of water and 100 ml. of 6N hydrochloric acid was heated on a steam bath for ninety minutes. The solid which was collected by filtering the hot reaction mixture was washed well first with water and then with ethanol, and dried in vacuo at 70°C. to yield 11.1 g. of 1-(2-chloroethyl)-1,4-dihydro-4-oxo-7-(4-pyridyl)-3-quinolinecarboxylic acid, as its hydrochloride, m.p. >300°C.

26A. Ethyl 7-(2-chloro-6-methyl-4-pyridyl)-1-ethyl-1,4-dihydro-4-oxo-3-quinolinecarboxylate is prepared following the procedure described in Example 2 using a corresponding molar equivalent quantity of ethyl 7-(2-chloro-6-methyl-4-pyridyl)-1,4-dihydro-4-oxo-3-quinolinecarboxylate in place of ethyl 1,4-dihydro-4-oxo-7-(4-pyridyl)-3-quinolinecarboxylate.

The above intermediate ethyl 7-(2-chloro-6-methyl-4-pyridyl)-1,4-dihydro-4-oxo-3-quinolinecarboxylate was prepared in six steps starting with 3-nitrobenzoylacetonitrile according to the procedure described in Examples 26B through 26F.

26B. 2-Hydroxy-6-methyl-4-(3-nitrophenyl)pyridine

To a mixture containing 76.0 g. of 3-nitrobenzoylacetonitrile and 125 ml. of acetone was added about 50 g. of polyphosphoric acid and the mixture was swirled until thoroughly mixed. Then an additional 1200 g. of polyphosphoric acid was added and the resulting reaction mixture was heated with stirring at about 70°C. for about ten minutes and then heated on a steam bath for one hour. To the hot reaction mixture was cautiously added dropwise another 35 ml. of acetone and the reaction mixture was heated with stirring allowing the reaction temperature to rise slowly to about 140°C. over a twenty minute period. The reaction mixture was cooled to about 90°C. and carefully added with stirring to seven liters of a mixture of ice and water. The resulting mixture was stirred until the excess polyphosphoric acid hydrolyzed and the precipitated solid was collected by filtering the mixture through two large sintered glass funnels. The combined solid was refluxed with enough dimethylformamide to yield a total volume of about 2,200 ml. to dissolve all of the solid and the resulting solution was heated for about one hour, thereby concentrating the volume of the solution to about 100 ml. The resulting solution was cooled and then chilled in an ice box. The solid that separated was slurried with warm water, and the water filtered off and discarded. The solid was again slurried with warm water, the mixture filtered and the solid dried in vacuo over phosphorus pentoxide at 25°C. to yield 34 g. of 2-hydroxy-6-methyl-4-(3-nitrophenyl)pyridine, m.p. 285.5°–288°C.

26C. 4-(3-Aminophenyl)-2-hydroxy-6-methylpyridine

A mixture containing 28.75 g. of 2-hydroxy-6-methyl-4-(3-nitrophenylpyridine), 300 ml. of dimethylformamide and 2.25 g. of 10% palladium-on-charcoal catalyst was treated under catalytic hydrogenation conditions using an initial hydrogen pressure of 40 p.s.i. After completion of the reduction, the reaction mixture was filtered to remove the catalyst which was washed successively with dimethylformamide and then methanol. The combined filtrate and washings were concentrated in vacuo to remove the solvents. The residue was dissolved in 100 ml. of hot methanol, the hot solution filtered, the filtrate concentrated to a volume of about 100 ml. and cooled. The resulting solid precipitate was collected, washed with a little methanol and air-dried to yield 17.0 g. of 4-(3-aminophenyl)-2-hydroxy-6-methylpyridine, m.p. 229.5°–231°C.

26D. Diethyl 3-(2-hydroxy-6-methyl-4-pyridyl)-anilinomethylenemalonate

A mixture containing 20.0 g. of 4-(3-aminophenyl)-2-hydroxy-6-methylpyridine and 21.75 g. of diethyl ethoxymethylenemalonate was thoroughly mixed and then heated at about 120°–130°C. for about one hour until all of the ethanol formed by the reaction had evolved. The reaction mixture was cooled and the remaining residue was dissolved in 325 ml. of hot acetonitrile. The hot solution was concentrated to a volume of about 110 ml., cooled and stored in an ice box. The resulting crystalline precipitate was collected, washed with a small quantity of ether and air-dried to yield 33.2 g. of diethyl 3-(2-hydroxy-6-methyl-4-pyridyl)anilinomethylenemalonate, m.p. 171°–173.5°C.

26E. Ethyl 1,4-dihydro-7-(2-hydroxy-6-methyl-4-pyridyl)-4-oxo-3-quinolinecarboxylate 21.6 g., was prepared following the procedure described in Example 1D using 25 g. of diethyl 3-(2-hydroxy-6-methyl-4-pyridyl)anilinomethylenemalonate and 200 ml. of Dowtherm A.

26F. Ethyl 7-(2-chloro-6-methyl-4-pyridyl)-1,4-dihydro-4-oxo-3-quinolinecarboxylate A mixture containing 1.62 g. of ethyl 1,4-dihydro-7-(2-hydroxy-6-methyl-4-pyridyl)-4-oxo-3-quinolinecarboxylate, 20 ml. of phosphorus oxychloride and 1 ml. of diemthylformamide was warmed on a steam bath for one hour and then heated in vacuo to remove the excess phosphorus oxychloride and solvent. The residue was dissolved in 200 ml. of chloroform. The chloroform solution was washed successively with 100 ml. of ice water and 100 ml. of 10% aqueous sodium bicarbonate solution, and then heated in vacuo to remove the chloroform. The solid residue was dissolved in 125 ml. of hot acetonitrile and the hot solution filtered. The filtrate was concentrated to a volume of 30 ml. by heating on a hot plate and chilled. The precipitated solid was collected, washed with a minimum of acetonitrile and air-dried to yield 1.12 g. of ethyl 7-(2-chloro-6-methyl-4-pyridyl)-1,4dihydro-4-oxo-3-quinolinecarboxylate, m.p. 172.5°–175°C.

27. 7-(2-Chloro-6-methyl-4-pyridyl)-1-ethyl-1,4-dihydro-4-oxo-3-quinolinecarboxylic acid A mixture of 1 g. of ethyl 7-(2-chloro-6-methyl-4-pyridyl)-1-ethyl-1,4-dihydro-4-oxo-3-quinolinecarboxylate and an excess (about four-fold) of 0.5% aqueous sodium hydroxide solution is heated on a steam bath for about fifteen minutes. The resulting solution is allowed to cool to about 70°C. and then partially neutralized (to a pH of about 9) with acetic acid. The warm solution is treated with decolorizing charcoal and filtered. The filtrate is warmed to about 55°C. and acetic acid is added dropwise with stirring until the pH of 6 is attained, allowing the temperature of the solution to gradually increase to about 65°–70°C. The mixture is allowed to cool. The crystalline precipitate is collected and dried to yield the product, 7-(2-chloro-6-methyl-4-pyridyl)-1-ethyl-1,4-dihydro-4-oxo-3-quinolinecarboxylic acid.

28. 7-(2-Aminomethyl-4-pyridyl)-1-ethyl-1,4-dihydro-4-oxo-3-quinolinecarboxylic acid in the form of its hydrochloride salt was obtained by refluxing 1.89 g. of ethyl 7-(2-acetylaminomethyl-4-pyridyl)-1-ethyl-1,4-dihydro-4-oxo-3-quinolinecarboxylate with 60 ml. of 3N aqueous hydrochloric acid for twenty-four hours, filtering the reaction mixture and evaporating the filtrate in vacuo to remove the excess hydrochloric acid together with the ethanol and acetic acid each formed by the reaction. The product was recrystallized by dissolving it in a minimum amount of hot water and adding hot ethanol to the hot solution; obtained was 800 mg., m.p. 241°–244°C.

29. Ethyl 7-(2-carbamyl-4-pyridyl)-1-ethyl-1,4-dihydro-4-oxo-3-quinolinecarboxylate A mixture containing 1.0 g. of ethyl 7-(2-cyano-4-pyridyl)-1-ethyl-1,4-dihydro-4-oxo-3-quinolinecarboxylate and 10 ml. of polyphosphoric acid was heated for two and one-half hours at 95°–100°C. The reaction solution was cooled to about 50°C. and poured into 40 ml. of cold water with stirring. The precipitated solid was collected, washed successively with dilute aqueous sodium bicarbonate solution and water, air-dired, recrystalllzed from dimethylformamide, washed successively with acetonitrile and ether, and dried to yield 610 mg. of ethyl 7-(2-carbamyl-4-pyridyl)-1-ethyl-1,4-dihydro-4-oxo-3-quinolinecarboxylate, m.p. 244°–245°C.

30. 7-(2-Amino-4-pyridyl)-1-ethyl-1,4-dihydro-4-oxo-3-quinolinecarboxylic acid To 0.05 mole of ethyl 7-(2-carbamyl-4-pyridyl)-1-ethyl-1,4-dihydro-4-oxo-3-quinolinecarboxylate in 200 ml. of dimethylformamide is added 0.05 mole of lead tetraacetate followed by 15 ml. of triethylamine whereupon an exothermic reaction ensues. The reaction mixture is allowed to stand for about thirty minutes; the solvents are distilled off in vacuo; and, the residue is treated with cold 3N hydrochloric acid. The precipitated lead dichloride is filtered off. The filtrate is boiled for one hour and then concentrated in vacuo to remove the hydrochloric acid and to yield 7-(2-amino-4-pyridyl)-1-ethyl-1,4-dihydro-4-oxo-3-quinolinecarboxylic acid in the form of its hydrochloride salt.

31. Ethyl 7-(2-acetoxy-4-pyridyl)-1-ethyl-1,4-dihydro-4-oxo-3-quinolinecarboxylate A mixture containing 0.9 g. of ethyl 1-ethyl-1,4-dihydro-7-(1-oxido-4-pyridyl)-4-oxo-3-quinolinecarboxylate and 10 ml. of acetic anhydride was refluxed for two hours and the solvents removed in vacuo. To the residue was added 3 ml. of ethanol and the ethanol was distilled off in vacuo. The remaining solid was dissolved in 10 ml. of hot isopropyl acetate and the solution chilled. The separated solid was collected and dried to yield about 200 mg. of ethyl 7-(2-acetoxy-4-pyridyl)-1-ethyl-1,4-dihydro-4-oxo-3-quinolinecarboxylate.

32. 1-Ethyl-1,4-dihydro-7-(2-hydroxy-4-pyridyl)-4-oxo-3-quinolinecarboxylic acid A mixture containing 13.3 g. of ethyl 1-ethyl-1,4-dihydro-7-(1-oxido-4-pyridyl)-4-oxo-3-quinolinecarboxylate in 100 ml. of acetic anhydride was refluxed with stirring for one hour. the reaction mixture was concentrated in vacuo and the oily product was treated with 25 ml. of ethanol. The resulting solution was heated in vacuo to remove the ethanol and to leave ethyl 7-(2-acetoxy-4-pyridyl)-1-ethyl-1,4- dihydro-4-oxo-3-quinolinecarboxylate which was refluxed for three hours with excess dilute aqueous hydrochloric acid. The separated solid was collected, washed successively with water and ethanol, and recrystallized twice from dimethylformamide using decolorizing charcoal and twice from acetic acid using decolorizing charcoal to yield 4.6 g. of 1-ethyl-1,4-dihydro-7-(2-hydroxy-4-pyridyl)-4-oxo-3-quinolinecarboxylic acid, m.p. 304°–306°C. with decomposition. The melting point of this product was raised to 308°–309°C. with decomposition by further purification as follows. A sample was taken up in dilute aqueous sodium hydroxide solution; the solution was treated with decolorizing charcoal and filtered; and, the filtrate was acidified with dilute hydrochloric acid. The precipitated solid was collected, washed well with distilled water and the wet solid was azeotroped with xylene to remove the water. The solid was collected, washed successively with acetonitrile and ether, dried in vacuo at 100°C. and recrystallized from dimethylformamide.

33. Methyl 1-ethyl-1,4-dihydro-7-(2-methoxy-4pyridyl)-4-oxo-3-quinolinecarboxylate To 10 g. of 1-ethyl-1,4-dihydro-7-(2-hydroxy-4-pyridyl)-4-oxo-3-quinolinecarboxylic acid suspended in 200 ml of chloroform is added excess diazomethane dissolved in ether. The suspension is stirred for twenty-four hours; the resulting nearly clear solution is filtered; and, the filtrate is evaporated to remove the solvents and to yield the product, methyl 1-ethyl-1,4-dihydro-7-(2-methoxy-4-pyridyl)-4-oxo-3-quinolinecarboxylate.

34. Ethyl 1-ethyl-1,4-dihydro-4-oxo-7-(4-pyridyl)-3-quinolinecarboxylate

A mixture containing 50 g. of ethyl 1,4-dihydro-4-oxo-7-(4-pyridyl)-3-quinolinecarboxylate, 900 ml. of dimethylformamide and 60 g. of anhydrous potassium carbonate was stirred on a steam bath for thirty minutes. To this stirred solution heated on a steam bath was added dropwise over a period of 60 to 90 minutes a solution containing 51 g. of ethyl tosylate in 150 ml. of dimethylformamide. The reaction mixture was heated with stirring for another two hours and then filtered. The filtrate was heated in vacuo to remove the dimethylformamide and the residue was taken up in chloroform. The chloroform solution was washed with water and then evaporated in vacuo to remove the chloroform. The residue was crystallized from isopropyl alcohol to yield 33.4 g. of ethyl 1-ethyl-1,4-dihydro-4-oxo-7-(4-pyridyl)-3-quinolinecarboxylate, m.p. 169°–172°C.

35. Sodium 1-ethyl-1,4-dihydro-4-oxo-7-(4-pyridyl)-3-quinolinecarboxylate

To a mixture containing 15.02 g. of 1-ethyl-1,4-dihydro-4-oxo-7-(4-pyridyl)-3-quinolinecarboxylic acid and 300 ml. of methanol was added a solution of 2.75 g. of sodium methoxide in 50 ml. of methanol. The mixture was filtered and the filtrate treated with about 2 ml. of water and cooled. The crystalline precipitate was collected, washed with absolute methanol and dried at 70°C. to yield 9.5 g. of sodium 1-ethyl-1,4-dihydro-4-oxo-7-(4-pyridyl)-3-quinolinecarboxylate, m.p. 26°–261°C.

36. 1-Ethyl-1,4-dihydro-4-oxo-7-(4-pyridyl)-3-quinolinecarboxylic acid methanesulfonate To 2.94 g. of 1-ethyl-1,4-dihydro-4-oxo-7-(4-pyridyl)-3-quinolinecarboxylic acid in 50 ml. of methanol was added 6.96 g. of methanesulfonic acid; the resulting mixture was heated to reflux and then treated with 50 ml. of water to achieve a solution. The hot solution was treated with decolorizing charcoal and filtered. The filtrate was allowed to cool to room temperature and the precipitated crystalline salt was collected, washed well with absolute ethanol and dried to yield 1-ethyl-1,4-dihydro-4-oxo-7-(4-pyridyl)-3-quinolinecarboxylic acid methanesulfonate.

37. Ethyl 7-(2-chloro-4-pyridyl)-1-ethyl-1,4-dihydro-4-oxo-3-quinolinecarboxylate A mixture containing 600 mg. of ethyl 1-ethyl-1,4-dihydro-7-(2-hydroxy-4-pyridyl)-4-oxo-3-quinolinecarboxylate and 5.0 ml. of phosphorus oxychloride is refluxed with stirring for about eight hours; most of the excess phosphorus oxychloride is distilled off in vacuo; and, to the residue is added crushed ice. To the cold mixture is added gradually ammonium hydroxide solution until the mixture is basic. The cold mixture is allowed to stand for about ninety minutes; the pH is adjusted to about 8; and, the solid is collected. The solid is dissolved in chloroform. The chloroform layer is separated from a small amount of aqueous layer, dried over anhydrous potassium carbonate and concentrated in vacuo to remove the chloroform. The residue is crystallized from acetonitrile using decolorizing charcoal and dried in vacuo at 40°C. to yield ethyl 7-(2-chloro-4-pyridyl)-1-ethyl-1,4-dihydro-4-oxo-3-quinolinecarboxylate.

38. 1-Ethyl-7-(2-formyl-6-methyl-4-pyridyl)-1,4-dihydro-4-oxo-3-quinolinecarboxylic acid A mixture containing 5 g. of 1-ethyl-1,4-dihydro-7-(2-hydroxymethyl-6-methyl-4-pyridyl)-4-oxo-3-quinolinecarboxylic acid, 200 ml. of chloroform and 15 g. of activated manganese dioxide is refluxed with stirring having a continuous water separator attached to the reaction vessel. The reaction mixture is refluxed for about six hours after which time the theoretical quantity of water is collected. The reaction mixture is then filtered while hot and the filter cake is washed with hot chloroform. The combined filtrate and washings are treated with decolorizing charcoal, the mixture filtered, and the filtrate evaporated in vacuo to yield the product, 1-ethyl 7-(2-formyl-6-methyl-4-pyridyl)-1,4-dihydro-4-oxo-3-quinolinecarboxylic acid.

39. 1-Ethyl-7-(2,6-diethyl-4-pyridyl)-1,4-dihydro-4-oxo-3-quinolinecarboxylic acid is prepared following the procedure described in Example 6A using a corresponding molar equivalent quantity of ethyl 7-(2,6-diethyl-4-pyridyl)-1,4-dihydro-4-oxo-3-quinolinecarboxylate in place of ethyl 1,4-dihydro-7-(2,6-dimethyl-4-pyridyl)-4-oxo-3-quinolinecarboxylate. The intermediate ethyl 7-(2,6- diethyl-4-pyridyl)-1,4-dihydro-4-oxo-3-quinolinecarboxylate is prepared following the procedures described in Example 6B and 6C starting with molar equivalent quantity of 4-(3-aminophenyl)-2,6-diethylpyridine in place of 4-(3-aminophenyl)-2,6-dimethylpyridine.

40. Ethyl 1-ethyl-1,4-dihydro-7-(2-methyl-1-oxido-4-pyridyl)-4-oxo-3-quinolinecarboxylate is prepared following the procedure described in Example 13 using a molar equivalent quantity of ethyl 1-ethyl-1,4-dihydro-7-(2-methyl-4-pyridyl)-4-oxo-3-quinolinecarboxylate in place of the corresponding 7-(2,6-dimethyl-4-pyridyl) compound.

41. 1-Ethyl-1,4-dihydro-7-(2-hydroxymethyl-4-pyridyl)-4-oxo-3-quinolinecarboxylic acid is prepared following the procedure described in Example 15 using a corresponding molar equivalent quantity of ethyl 1,4-dihydro-7-(2-methyl-1-oxide-4-pyridyl)-4-oxo-3-quinolinecarboxylate in place of the corresponding 7-(2,6-dimethyl-1-oxido-4-pyridyl) compound. The corresponding ethyl 7-(2-acetoxymethyl-4-pyridyl)-1-ethyl-1,4-dihydro-4-oxo-3-quinolinecarboxylate is first obtained as in Example 15 and this 7-(2-acetoxymethyl-4-pyridyl) compound is then hydrolyzed by refluxing using 3N hydrochloric acid as in Example 15 to yield the said 7-(2-hydroxymethyl-4-pyridyl) compound.

42. 1-Ethyl-1,4-dihydro-7-(2-methoxy-4-pyridyl)-4-oxo-3-quinolinecarboxylic acid in the form of its hydrochloride, is prepared by hydrolyzing methyl 1-ethyl-1,4-dihydro-7-(2-methoxy-4-pyridyl)-4-oxo-3-quinolinecarboxylate with aqueous hydrochloric acid according to the procedure described in Example 8B.

43. 7-(2-Chloro-4-pyridyl)-1-ethyl-1,4-dihydro-4-oxo-3-quinolinecarboxylic acid in the form of its hydrochloride, is obtained by hydrolyzing ethyl 7-(2-chloro-4-pyridyl)-1-ethyl-1,4-dihydro-4-oxo-3-quinolinecarboxylate with aqueous hydrochloric acid according to the procedure described in Example 8B.

44A. Ethyl 1,4-dihydro-1-methyl-7-(2,6-dimethyl-4-pyridyl)-4-oxo-3-quinolinecarboxylate 14.5 g., m.p. 215°–217°C., was obtained following the procedure described in Example 2 using 16.1 g of ethyl 1,4-dihydro-7-(2,6-dimethyl-4-pyridyl)-4-oxo-3-quinolinecarboxylate, 156 ml. of dimethylformamide, 16 g. of anhydrous potassium carbonate, 3.4 ml. of methyl iodide, a heating period of one hour on a steam bath and crystallization from isopropyl alcohol-ether.

44B. 1,4-Dihydro-1-methyl-7-(2,6-dimethyl-4-pyridyl)-4-oxo-3-quinolinecarboxylic acid 11.8 g., m.p. >315°C., was prepared following the alkaline hydrolysis procedure in Example 2 using 14 g. of ethyl 1,4-dihydro-1-methyl-7-(2,6-dimethyl-4-pyridyl)-4-oxo-3-quinolinecarboxylate, 5 g. of sodium hydroxide, 200 ml. of water and a heating period of one hour on a steam bath. A sample of this acid was converted to its hydrochloride as in Example 8B and was recrystallized from 6N hydrochloric acid, m.p. >335°C.

45A. Ethyl 1-ethyl-7-(2,6-diethyl-4-pyridyl)-1,4-dihydro-4-oxo-3-quinolinecarboxylate 14 g., m.p. 135°–137°C., was prepared following the procedure described in Example 8A using 16.8 g. of ethyl 7-(2,6-diethyl-4-pyridyl)-1,4-dihydro-4-oxo-3-quinolinecarboxylate, 16.8 g. of anhydrous potassium carbonate, 250 ml. of dimethylformamide, 5.5 ml. of ethyl iodide, a heating period of thirty minutes on a steam bath and trituration of the product with ether.

45B. 1-Ethyl-7-(2,6-diethyl-4-pyridyl)-1,4-dihydro-4-oxo-3-quinolinecarboxylic acid A mixture containing 14 g. of ethyl 1-ethyl-7-(2,6-diethyl-4-pyridyl)-1,4-dihydro-4-oxo-3-quinolinecarboxylate and 50 ml. of 6N aqueous potassium hydroxide solution was heated on a steam bath for about one hour whereupon all of the solid had dissolved. The mixture was cooled to room temperature and filtered. The filtrate was acidified and the resulting tan solid was collected, washed with water and dried to yield 11.5 g. of 1-ethyl-7-(2,6-diethyl-4-pyridyl)-1,4-dihydro-4-oxo-3-quinolinecarboxylic acid, m.p. 210°–212°C.

The intermediate ethyl 7-(2,6-diethyl-4-pyridyl)-1,4-dihydro-4-oxo-3-quinolinecarboxylate used in Example 45A was prepared in seven steps starting with 3-nitrobenzaldehyde as described hereinbelow in Examples 45C through 45I.

45C. Diethyl 2,6-diethyl-1,4-dihydro-4-(3-nitrophenyl)-3,5-pyridine-dicarboxylate A solution containing 135 g. of ethyl propionylacetate 70.5 g. of 3-nitrobenzaldehyde, 260 ml. of ethanol and 45 ml. of concentrated ammonium hydroxide was heated under reflux for six hours and then concentrated in vacuo on a steam bath. The remaining oily material was crystallized from ether to yield 85 g. of diethyl 2,6-diethyl-1,4-dihydro-4-(3-nitrophenyl)-3,5-pyridine-dicarboxylate, m.p. 126°–128°C.

Dimethyl 1,4-dihydro-2,6-diethyl-4-(3-nitrophenyl)-3,5-pyridine-dicarboxylate, 82 g., m.p. 158°–160°C., was prepared as above but using 106 g. of methyl propionylacetate, 60 g. of 3-nitrobenzaldehyde, 34 ml. of concentrated ammonium hydroxide, 240 ml. of methanol and a reflux period of five hours.

45D. Diethyl 2,6-diethyl-4-(3-nitrophenyl)pyridine-3,5-dicarboxylate

A mixture containing 60 g. of diethyl 2,6-diethyl-1,4-dihydro-4-(3-nitrophenyl)-3,5-pyridine-dicarboxylate and 600 ml. of 4N nitric acid was heated with stirring on a steam bath for one hour, was carefully neutralized with solid potassium carbonate, and was cooled in an ice bath. A yellow solid that separated was collected and started to melt, whereupon it was treated with a mixture of water and chloroform and the mixture shaken well. The chloroform layer was separated and evaporated in vacuo to remove the chloroform and to yield 59.6 g. of a yellow oil. The oil was dissolved in ether and treated and with an excess of hydrogen chloride in ether and allowed to stand at room temperature for about an hour. The resulting crystalline product was collected, washed with ether and dried in vacuo at 60°C. to yield 40 g. of diethyl 2,6-diethyl-4-(3-nitrophenyl)-3,5-pyridine-dicarboxylate as its hydrochloride, m.p. 111°–114°C.

Dimethyl 2,6-diethyl-4-(3-nitrophenyl)-3,5-pyridine-dicarboxylate, 108 g., as a yellow oil, was prepared following the above procedure but using 120 g. of dimethyl 1,4-dihydro-2,6-diethyl-4-(3-nitrophenyl)-3,5-pyridine-dicarboxylate and 1200 ml. of 4N aqueous nitric acid.

45E. 2,6-Diethyl-4-(3-nitrophenyl)-3,5-pyridine-dicarboxylic acid

A mixture containing 50 g. of diethyl 2,6-diethyl-4-(3-nitrophenyl)-3,5-pyridine-dicarboxylate hydrochloride, 200 ml. of ethanol, 60 ml. of 35% aqueous sodium hydroxide solution and 100 ml. of water was refluxed with stirring on a steam bath for five hours. The ethanol was removed in vacuo and the residue dissolved in water. The aqueous solution was treated with decolorizing charcoal and filtered. The filtrate was acidified, and the resulting solid was collected, washed with water and dried in vacuo to yield 30.5 g. of 2,6-diethyl-4-(3-nitrophenyl)-3,5-pyridine-dicarboxylic acid, m.p. >230°C.

A mixture containing 108 g. of dimethyl 2,6-diethyl-4-(3-nitrophenyl)-3,5-pyridine-dicarboxylate, 60 g. of sodium hydroxide, 200 ml, of ethanol and 500 ml. of water was refluxed with stirring for four hours and allowed to stand at room temperature overnight. The ethanol was distilled off in vacuo and the residue acidified with dilute aqueous hydrochloric acid. The solid was collected, washed with water and dried in vacuo to yield 71 g. of 2,6-diethyl-4-(3-nitrophenyl)-3,5-pyridine-dicarboxylic acid which was used without further purification in the following decarboxylation step.

45F. 2,6-Diethyl-4-(3-nitrophenyl)-pyridine

To 1000 ml. of Dowtherm A (eutectic mixture of diphenyl and diphenyl ether) at 180°C. was added with stirring 42 g. of 2,6-diethyl-4-(3-nitrophenyl)-3,5-pyridine-dicarboxylic acid over a period of two minutes and then over a period of fifteen minutes the reaction mixture was brought to a refluxing temperature >250°C. Stirring was continued under reflux for fifteen minutes. The reaction mixture was cooled to room temperature, filtered and the filtrate extracted with 6N hydrochloric acid. The acidic extract was basified with ammonium hydroxide and the oily product extracted with ether. The ether extract was treated with ethanolic hydrogen chloride; the precipitate was collected and dried to yield 16 g. of 2,6-diethyl-4-(3-nitrophenyl)pyridine hydrochloride, m.p. 222°–225°C.

In another run of the above preparation using 75 g. of 2,6-diethyl-4-(3-nitrophenyl)-3,5-pyridine-dicarboxylic acid and 1500 ml. of Dowtherm A, the filtered reaction mixture was extracted with four 300 ml. portions of 6N hydrochloride acid, the acidic extracts were combined and basified with ammonium hydroxide. The resulting oily product was taken up in ether and the ether solution was dried over anhydrous magnesium sulfate and evaporated to remove the ether, thereby yielding 27 g. of 2,6-diethyl-4-(3-nitrophenyl)pyridine as an oil

45G. 4-(3-Aminophenyl)-2,6-diethylpyridine

A mixture containing 36 g. of 2,6-diethyl-4-(3-nitrophenyl)-pyridine, 0.5 g. of platinum oxide and 225 ml. of acetic acid was shaken with hydrogen under pressure for about ninety minutes after which time about 85% of the theoretical quantity of hydrogen had been taken up. The catalyst was filtered off and the filtrate evaporated in vacuo to yield an oil which was crystallized with methanolic hydrogen chloride to yield 35.6 g. of 4-(3-aminophenyl)-2,6-diethylpyridine dihydrochloride, m.p. >300°C.

45H. Diethyl 3-(2,6-diethyl-4-pyridyl)anilinomethylenemalonate

A mixture containing 27.5 g of 4-(3-aminophenyl)-2,6-diethylpyridine and 29.5 g. of diethyl ethoxymethylenemalonate was heated at 135°–140°C. for one hour, cooled to room temperature and dissolved in a mixture of ether and n-hexane. The solution was filtered through a pad of infusorial earth and the filtrate was evaporated to dryness to yield a brown oil which solidified, thereby yielding 38 g. of diethyl 3-(2,6-diethyl-4-pyridyl) anilinomethylenemalonate, m.p. 65°–67°C.

45I. Ethyl 7-(2,6-diethyl-4-pyridyl)-1,4-dihydro-4-oxo-3-quinolinecarboxylate To 350 ml. of boiling Dowtherm A was added with stirring 38 g. of diethyl 3-(2,6-diethyl-4-pyridyl)anilinomethylenemalonate; boiling was continued with stirring for twelve minutes and then the reaction mixture was cooled to room temperature. The solid that separated was collected and crystallized from dimethylformamide to yield 30 g. of ethyl 7-(2,6-diethyl-4-pyridyl)-1,4-dihydro-4-oxo-3-quinolinecarboxylate, m.p. >300°C.

46A. Ethyl 7-(2,6-diethyl-4-pyridyl)-1,4-dihydro-1-methyl-4-oxo-3-quinolinecarboxylate A mixture containing 18 g. of ethyl 7-(2,6-diethyl-4-pyridyl)-1,4-dihydro-4-oxo-3-quinolinecarboxylate, 18 g. of anhydrous sodium carbonate and 100 ml. of dimethylformamide was stirred on a steam bath for thirty minutes. Then 3.4 ml. of methyl iodide was added and the mixture was heated on a steam bath with stirring for another thirty minutes. The reaction mixture was evaporated to dryness and the residue was taken up with a mixture of water and chloroform. The chloroform layer was separated and evaporated in vacuo to remove the chloroform. The residue was crystallized from ether to yield 16.5 g. of ethyl 7-(2,6-diethyl-4-pyridyl)-1,4-dihydro-1-methyl-4-oxo-3-quinolinecarboxylate, m.p. 215°–217°C.

46B. 7-(2,6-Diethyl-4-pyridyl)-1,4-dihydro-1-methyl-4-oxo-3-quinolinecarboxylic acid 11.5 g., m.p. 250°–252°C., was prepared by alkaline hydrolysis as in Example 3 using 16 g. of ethyl 7-(2,6-diethyl-4-pyridyl)-1,4-dihydro-1-methyl-4-oxo-3-quinolinecarboxylate, 5 g. of sodium hydroxide, 200 ml. of water and purification by slurrying the product with hot methanol. Its hydrochloride, 10.1 g., m.p. >300°C. with decomposition, was prepared by dissolving the product in 150 ml. of boiling 6N aqueous hydrochloric acid, diluting the solution with hot methanol, allowing the hot solution to cool to room temperature, collecting the crystalline solid, washing it with methanol and drying it in vacuo at 80°C.

47A. Ethyl 1,4-dihydro-7-(2,6-dimethyl-4-pyridyl)-4-oxo-1-n-propyl-3-quinolinecarboxylate 14 g., m.p. 135°–136°C. was prepared as in Example 3 using 16.9 g. of ethyl 1,4-dihydro-7-(2,6-dimethyl-4-pyridyl)-4-oxo-3-quinolinecarboxylate, 16 g. of anhydrous potassium carbonate, 150 ml. of dimethylformamide, 9 g. of n-propyl iodide, a heating period of one hour on a steam bath and crystallization from ether.

47B. 7-(2,6-Dimethyl-4-pyridyl)-1,4-dihydro-4-oxo-1-n-propyl-3-quinolinecarboxylic acid 10.5 g., m.p. 233°–235°C., was prepared following the procedure described in Example 3 using 14 g. of ethyl 7-(2,6-dimethyl-4-pyridyl)-1,4-dihydro-4-oxo-1-n-propyl-3-quinolinecarboxylate, 5 g. of sodium hydroxide, 200 ml. of water and a heating period of ninety minutes on a steam bath. It was purified by conversion to its hydrochloride with 6N hydrochloride acid, washing the salt with methanol, reconverting the hydrochloride to the free base form by treating a sodium hydroxide solution thereof with acetic acid, collecting the product, washing it with water and drying it in vacuo at 80°C.

48A. 1-Ethyl-1,4-dihydro-5-methyl-4-oxo-7-(4-pyridyl)-3-quinolinecarboxylic acid 8.1 g., m.p. >250°C. with decomposition, was prepared as in Example 2 using 14 g. of ethyl 1,4-dihydro-5-methyl-4-oxo-7-(4-pyridyl)-3-quinolinecarboxylate, 4.2 g. of ethyl iodide, 15 g. of anhydrous potassium carbonate, 200 ml. of dimethylformamide to yield first its ethyl ester which was then hydrolyzed with 100 ml. of 10% aqueous sodium hydroxide solution as in Example 2.

The intermediate ethyl 1,4-dihydro-5-methyl-4-oxo-7-(4-pyridyl)-3-quinolinecarboxylate was prepared in two steps starting with 4-(3-amino-5-methylpheny)pyridine as described hereinbelow in Examples 48B and 48C.

48B. Diethyl 5-(4-pyridyl)-m-toluidinomethylenemalonate

A mixture containing 28 g. of 4-(3-amino-5-methylphenyl)pyridine and 30 g. of diethyl ethoxymethylenemalonate was heated in an oil bath at 120°–140°C. for two hours and then cooled to room temperature. The brown oil was crystallized from n-hexane-ether to yield 37 g. of diethyl 5-(4-pyridyl)-m-toluidinomethylenemalonate, m.p. 95°–97°C.

The above 4-(3-amino-5-methylphenyl)pyridine can be prepared according to the known two-step procedure of Haworth et al (J. Chem. Soc. 1940, page 349) in preparing 4-(3-aminophenyl)pyridine but using corresponding molar equivalent quantities of 3-nitro-5-methylphenyldiazonium chloride and pyridine to obtain 4-(5-methyl-3-nitrophenyl) pyridine and then reducing this nitro compound with stannous chloride and concentrated hydrochloric acid to yield 4-(3-amino-5-methylphenyl)pyridine.

48C. Ethyl 1,4-dihydro-5-methyl-4-oxo-7-(4-pyridyl)-3-quinolinecarboxylate

A solution containing 18 g. of diethyl 5-(4-pyridyl)-m-toluidinomethylenemalonate and 150 ml. of Dowtherm A was boiled for fifteen minutes and then cooled to room temperature. The tan solid that separated was collected, washed with isopropyl alcohol and crystallized from dimethylformamide to yield 12.5 g. of ethyl 1,4-dihydro-5-methyl-4-oxo-7-(4-pyridyl)-3-quinolinecarboxylate, m.p. >280°C. with decomposition.

49A. Ethyl 1-ethyl-1,4-dihydro-7-(2,5-dimethyl-4-pyridyl)-4-oxo-3-quinolinecarboxylate 14.6 g., m.p. 157°–158°C., was obtained following the procedure described in Example 1A using 36.2 g. of ethyl 1,4-dihydro-7-(2,5-dimethyl-4-pyridyl)-4-oxo-3-quinolinecarboxylate, 28 g. of anhydrous potassium carbonate, 8.8 ml. of ethyl iodide, 400 ml. of dimethylformamide and recrystallization from ethyl acetate.

49B. 1-Ethyl-1,4-dihydro-7-(2,5-dimethyl-4-pyridyl)-4-oxo-3-quinolinecarboxylic acid 22.0 g. as its hydrochloride, m.p. >300°C., was prepared by acid hydrolysis as in Example 8B using 24.5 g. of ethyl 1-ethyl-1,4-dihydro-7-(2,5-dimethyl-4-pyridyl)-4-oxo-3-quinolinecarboxylate, 100 ml. of 6N hydrochloric acid, a heating period of five and one-half hours on a steam bath and recrystallization from water using decolorizing charcoal.

The above intermediate ethyl 1,4-dihydro-7-(2,5-dimethyl-4-pyridyl)-4-oxo-3-quinolinecarboxylate used in Example 49A was prepared in five steps starting with α-(3-nitrobenzoyl)propionitrile as described below in Examples 49C through 49G.

49C. 3,6-Dimethyl-4-(3-nitrophenyl)-2(1H)-pyridone

A mixture containing 400 g. of polyphosphoric acid and 40.8 g. of α-(3-nitrobenzoyl)propionitrile was heated to 70°C. with stirring. After about five minutes, 50 ml. of acetone was stirred in and after another five minutes the reaction mixture was heated on a steam bath with stirring for about two hours and twenty minutes. The hot reaction solution was slowly poured with stirring into two liters of water. Next was added gradually 350 ml. of 35% aqueous sodium hydroxide solution and ice; stirring was continued for about thirty minutes. The resulting solid was collected, washed with water, triturated with methanol and recrystallized from about 300 ml. of dimethylformamide to yield 27.4 g. of 3,6-dimethyl-4-(3-nitrophenyl)-2(1H)-pyridone, m.p. 284°–286°C.

49D. 2-Chloro-3,6-dimethyl-4-(3-nitrophenyl) pyridine

A mixture containing 82.7 g. of 3,6-dimethyl-4-(3-nitrophenyl)-2(1H)-pyridone and 185 ml. of phenylphosphonic dichloride was heated at 155°–160°C. for 30 minutes with stirring with a drying tube attached to the reaction vessel. The temperature then gradually dropped to about 140°C. and heating was continued for a total of about four hours. The reaction mixture was then poured with stirring into about two liters of water. The resulting mixture was made strongly basic with ammonium hydroxide, adding ice as necessary to keep the temperature below about 40°C., and stirring was continued for about 30 minutes. The solid was collected and dissolved in about 500 ml. of chloroform. The chloroform solution was treated with decolorizing charcoal and anhydrous sodium sulfate, filtered and the filtrate concentrated to dryness. The resulting solid was recrystallized from ethyl acetate to yield 76.0 g. of 2-chloro-3,6-dimethyl-4-(3-nitrophenyl)pyridine, m.p. 138°–140°C.

49E. 4-(3-Aminophenyl)-2,5-dimethylpyridine

A mixture containing 94.5 g. of 2-chloro-3,6-dimethyl-4-(3-nitrophenyl)pyridine, 3.5 g. of 10% palladium-on-charcoal and 850 ml. of dimethylformamide was catalytically hydrogenated for two hours starting with an initial pressure of hydrogen of 260 p.s.i. An additional 5 g. of 10% palladium-on-charcoal was added and the hydrogenation was continued for another four hours. Then, there was added 140 ml. of triethylamine plus 12.1 g. of 10% palladium-on-charcoal and the hydrogenation was resumed for an additional seven hours, warming the reaction mixture up to about 43°C. The reaction mixture was filtered and the filtrate concentrated. The remaining oil was dissolved in chloroform. The chloroform solution was washed three times with water, dried over anhydrous sodium sulfate and concentrated in vacuo to remove the chloroform. The remaining oil was dissolved in ether; the ether solution was diluted to a volume of about 180 ml. and chilled. The crystalline solid was collected, washed with ice cold ether and dried to yield 49.8 g. of 4-(3-aminophenyl)-2,5-dimethylpyridine, m.p. 90°–92°C. A second crop of 9.0 g., m.p. 89°–90°C., also was obtained.

49F. Diethyl 3-(2,5-dimethyl-4-pyridyl)anilinomethylenemalonate 76.4 g., m.p. 86°–87°C., was prepared as in Example 5B using 58.5 g. of 4-(3-aminophenyl)-2,5-dimethylpyridine, 65.0 g. of diethyl ethoxymethylenemalonate and crystallizing the oily product with ether.

49G. Ethyl 1,4-dihydro-7-(2,5-dimethyl)-4-pyridyl)-4-oxo-3-quinolinecarboxylate 36.4 g., as a light brown granular solid, was prepared as in Example 5C using 47.8 g. of diethyl 3-(2,5-dimethyl-4-pyridyl) anilinomethylenemalonate, 1,700 ml. of Dowtherm A, a boiling period of seven minutes, addition of 100 ml. of white mineral oil, allowing the mixture to cool with stirring, collecting the solid product, washing it with benzene, triturating it with boiling benzene and drying it in vacuo at 60°C. overnight.

50A. Ethyl 1-ethyl-1,4-dihydro-7-(2,3-dimethyl-4-pyridyl)-4-oxo-3-quinolinecarboxylate 5.6 g., m.p. 157°–159°C., was prepared following the procedure described in Example 34 using 22.0 g. of ethyl 1,4-dihydro-7-(2,3-dimethyl-4-pyridyl)-4-oxo-3-quinolinecarboxylate, 325 ml. of dimethylformamide, 24 g. of anhydrous potassium carbonate, 20 g. of ethyl tosylate in 75 ml. of dimethylformamide added over a period of 45 minutes, and solidification of the oily product by trituration with isopropyl acetate.

50B. 1-Ethyl-1,4-dihydro-7-(2,3-dimethyl-4-pyridyl)-4-oxo-3-quinolinecarboxylic acid 3.0 g., m.p. 326°–328°C. with decomposition, was prepared as in Example 8B using 5.1 g. of ethyl 1-ethyl-1,4-dihydro-7-(2,3-dimethyl 4-pyridyl)-4-oxo-3-quinolinecarboxylate, 50 ml. of 6N hydrochloric acid, a reflux period of four hours and isolation of the product as follows. The reaction mixture was concentrated in vacuo; the solid residue was taken up in dilute aqueous sodium hydroxide solution; the solution treated with decolorizing charcoal and filtered; and, the filtrate neutralized with dilute acetic acid. The resulting white solid was collected, washed successively with distilled water, ethanol and ether; and, recrystallized from dimethylformamide.

The intermediate ethyl 1,4-dihydro-7-(2,3-dimethyl-4-pyridyl)-4-oxo-3-quinolinecarboxylate used in Example 50A was prepared in five steps starting with 3-nitrobenzoylacetonitrile as described in Examples 50C through 50G.

50C. 6-Hydroxy-2,3-dimethyl-4-(3-nitrophenyl) pyridine

To a stirred mixture containing 19.0 g. of 3-nitrobenzoylacetonitrile and 60 ml. of 2-butanone was added 140 g. of polyphosphoric acid which had been heated to 70°C. The reaction mixture was heated on a steam bath for one hour, heated up to 125°C. over a 10 minute period and held at 125°C. for five minutes. The reaction mixture was poured into water with stirring. The solid precipitate was collected and the filtrate extracted with chloroform. The collected solid was dissolved in the chloroform extract by heating. The layers were separated. The chloroform layer was filtered and the filtrate concentrated in vacuo to remove the chloroform. The partially crystallized residue was slurried with 75 ml. of ethanol and the solid collected. The filtrate was concentrated and the oily-gummy residue was taken up in 50 ml. of acetonitrile and the solution chilled. The separated solid was collected and combined with the above solid obtained above from the ethanol mixture. The combined solids were recrystallized from dimethylformamide to yield 8.2 g. of 6-hydroxy-2,3-dimethyl-4-(3-nitrophenyl)pyridine, m.p. 270°–271°C. A second crop weighing 1.9 g., also melting at 270°–271°C., was obtained after isolation and recrystallization from dimethylformamide.

50D. 6-chloro-2,3-dimethyl-4-(3-nitrophenyl) pyridine

A mixture containing 8.9 g. of 6-2,3-dimethyl-4-(3-nitrophenyl)pyridine and 19 ml. of phenyl phosphonic dichloride was heated at 165°–175°C. for one hour. The resulting reaction solution was cooled to 80°C. and poured into water. The aqueous solution was stirred and basified with concentrated ammonium hydroxide. The resulting precipitate was collected, washed with water and taken up in chloroform. The chloroform solution was dried over anhydrous sodium sulfate, the mixture filtered and the filtrate evaporated to yield a white solid. The solid was recrystallized from 100 ml.

of isopropyl acetate to yield 6.5 g. of 6-chloro-2,3-dimethyl-4-(3-nitrophenyl) pyridine, m.p. 167°–169°c.

50E. 4-(3-Aminophenyl)-2,3-dimethylpyridine

A mixture containing 8.0 g. of 6-2,3-dimethyl-4-(3-nitrophenyl)pyridine, 100 ml. of dimethylformamide and 0.4 g. of 10% palladium-on-charcoal was hydrogenated whereupon three equivalents of hydrogen were taken up. To the reaction mixture was added 11 ml. of triethylamine, and an additional 1.5 g. of 10% palladium-on-charcoal; hydrogenation was resumed whereupon one additional equivalent of hydrogen was taken up. The reaction mixture was filtered to remove the catalyst and the filtrate evaporated in vacuo to an oily residue. To the residue was added water and dilute sodium hydroxide solution. The alkaline solution was extracted with methylene dichloride; the extract was dried over anhydrous magnesium sulfate and filtered; the filtrate was concentrated in vacuo to a pale yellow solid; and the solid was recrystallized from isopropyl acetate to yield 2.4 g. of 4-(3-aminophenyl)-2,3-dimethylpyridine, m.p. 140°–142°C.

In another run using 21.7 g. of 6-chloro-2,3-dimethyl-4-(3-nitrophenyl)pyridine, 270 ml. of dimethylformamide, 3.8 g. of 10% palladium-on-charcoal, 30 ml. of triethylamine (the triethylamine and 2.7 g. of the 10% palladium-on-charcoal added after three equivalents of hydrogen had been taken up, as above), there was obtained 12.9 g. of 4-(3-aminophenyl)-2,3-dimethylpyridine, m.p. 143°–144.5°C.

50F. Diethyl 3-(2,3-dimethyl-4-pyridyl)anilinomethylenemalonate 27.6 g., m.p. 74°–76°C., was prepared as in Example 6B using 16.7 g. of 4-(3-aminophenyl)-2,3-dimethylpyridine, 19.5 g. of diethyl ethoxymethylenemalonate and recrystallization from n-hexane containing about 10% ether.

50G. Ethyl 1,4-dihydro-7-(2,3-4-pyridyl-4-oxo-3-quinolinecarboxylate 22.0 g., m.p. 269°–271°C. was prepared as in Example 6C using 27.6 g. of diethyl 3-(2,3-dimethyl-4-pyridyl)anilino methylenemalonate and 275 ml. of Dowtherm A.

51A. Ethyl 1-1,4-dihydro-7-(2,3,5-trimethyl-4-pyridyl-4-oxo-3-quinolinecarboxylate 21 g., m.p. 226°–228°C., was run following the procedure described in Example 8A using 33.6 g. of ethyl 1,-4-dihydro-7-(2,3,5-trimethyl-4-pyridyl-4-oxo-3-quinolinecarboxylate, 250 ml. of dimethylformamide, 27.6 g. of anhydrous potassium carbonate, 15.6 g. of ethyl iodide and recrystallization from chloroform-n-hexane.

51B. Ethyl-1,4-dihydro-7-(2,3,5-trimethyl-4-pyridyl)-4-oxo-3-quinolinecarboxylic acid 13.0 g., m.p. 277°–279°C. with decomposition, was prepared following the procedure described in Example 8B using 19.0 g. of ethyl 1-ethyl-1,4-dihydro-7-(2,3,5-trimethyl-4-pyridyl)-4-oxo-3-quinolinecarboxylate, 150 ml. of 6N hydrochloric acid, a heating period on a steam bath for four hours, neutralization of the reaction mixture with aqueous sodium hydroxide and sodium bicarbonate, collecting the product and recrystallizing it from chloroform-n-hexane.

The intermediate ethyl 1,4-dihydro-7-(2,3,5-trimethyl-4-pyridyl)-4-oxo-3-quinolinecarboxylate used in Example 51A was prepared in six steps starting with α-bromo-3-nitropropiophenone as described in Examples 51C–51H.

51C. 2-(3-Nitrobenzoyl)propanenitrile

To a solution containing 80.4 g. of potassium cyanide in 160 ml. of water kept at about 25°C. with external cooling was added 400 ml. of dimethyl sulfoxide. To the resulting solution kept at about 25°C. with external cooling was added slowly with stirring 103.2 g. of α-bromo-3-nitropropiophenone. The reaction was then stirred overnight (about 15 hours) at room temperature and then added to a mixture containing two liters of ice and water plus 100 ml. of hydrochloric acid. The water was decanted and the remaining product was taken up in ethyl acetate. The resulting solution was filtered and the filtrate washed successively with water and brine, dried and then evaporated in vacuo to remove the ethyl acetate. The residue was taken up in hot benzene, the benzene mixture filtered while hot and the filtrate cooled. The benzene solution was then treated with decolorizing charcoal, the mixture filtered, n-hexane added to the filtrate and the resulting solution allowed to stand in a cold room overnight. The resulting precipitate was collected and dried to yield 64 g. of 2-(3-nitrobenzoyl)propanenitrile, m.p. 71°–73°C.

51D. 3,5,6-Trimethyl-4-(3-nitrophenyl)-2(1H)-pyridone

To 2400 g. of polyphosphoric acid heated to 60°C. was added 243 g. of 2-(3-nitrobenzoyl)propanenitrile and the mixture heated to 90°C. To the hot mixture was added slowly with stirring 295 g. of 2-butanone over a period of about thirty minutes and heating on the steam bath was continued for 15 minutes whereupon a solution was obtained and the internal temperature rose to about 116°C. (steam bath removed after temperature rose to about 105°C.). The reaction mixture was poured into 12 liters of water and an excess of 35% aqueous sodium hydroxide solution (2,100 ml.) was added with cooling. After the water had been decanted, a minimum amount of acetone was added to dissolve most of the material. Next, a quantity of water equivalent to about three times that of the acetone solution was added and the mixture stirred. The solid was collected and slurried in hot acetone. The mixture was cooled and filtered to yield 115 g. of 3,5,6-trimethyl-4-(3-nitrophenyl)-2(1H)-pyridone, m.p. 259°–261°C. A sample of this product was further purified by recrystallizing it from dimethylformamide to yield an offwhite solid, m.p. 266°–267°C.

51 E. 2-Chloro-3,5,6-trimethyl-4-(3-nitrophenyl)-pyridine

A mixture containing 113 g. of 3,5,6-trimethyl-4-(3-nitrophenyl)-2(1H)-pyridone and 240 ml. of phenyl phosphonic dichloride was heated on an oil bath at 155°–160°C. for 90 minutes. The reaction mixture was allowed to cool and then poured into 2,600 ml. of water with stirring. The resulting solution was made strongly basic with ammonium hydroxide solution with external cooling. The resulting mixture was stirred for thirty minutes at room temperature. The precipitate was collected, dried, recrystallized from chloroform-n-hexane and dried in a vacuum oven at 60°C. to yield 92 g. of 2-chloro-3,5,6-trimethyl-4-(3-nitrophenyl)pyridine, m.p. 207°–208°C.

51F. 4-(3-Aminophenyl)-2,3,5-trimethylpyridine

A mixture containing 46 g. of 2-chloro-3,5,6-trimethyl-4-(3-nitrophenyl)pyridine, one liter of ethyl acetate and about 2.0 g. of 10% palladium-on-charcoal at 40 p.s.i. of hydrogen at room temperature for two hours. To the reaction mixture was then added 325 ml. of triethylamine and more (about 4.0 g.) of 10% palladium-on-charcoal and hydrogenation was continued at 40 p.s.i. of hydrogen at room temperature for two hours. The reaction mixture was filtered to remove the catalyst and the filtrate concentrated in vacuo to remove the solvent thereby yielding, as an off-white solid, 37 g. of 4-(3-aminophenyl)-2,3,5-trimethylpyridine.

51G. Diethyl 3-(2,3,5-trimethyl-4-pyridyl)anilinomethylenemalonate 106 g., m.p. 112°–114°C., was prepared following the procedure described in Example 5B using 72 g. of 4-(3-aminophenyl)-2,3,5-trimethylpyridine, 73.5 g. of diethyl ethoxymethylenemalonate, a heating period of 15 minutes at 130°C. and recrystallization from cyclohexane.

51H. Ethyl 1,4-dihydro-7-(2,3,5-trimethyl-4-pyridyl)-4-oxo-quinolinecarboxylate 12 g., m.p. 281°–282°C., was prepared following the procedure described in Example 8I using 30 g. of diethyl 3-(2,3,5-trimethyl-4-pyridyl)anilinomethylenemalonate, 1,200 ml. of Dowtherm A, washing the product with n-hexane and drying it. Three additional similar runs were carried out, thereby yielding 48 g. of the product, m.p. 281°–282°C.

52A. Ethyl 1-ethyl-1,4-dihydro-7-(3-methyl-4-pyridyl)-4-oxo-3-quinolinecarboxylate 0.9 g., m.p. 162°–163°C., was prepared as in Example 34 using 15.9 g. of ethyl 1,4-dihydro-7-(3-methyl-4-pyridyl)-4-oxo-3-quinolinecarboxylate, 275 ml. of dimethylformamide, 18.2 g. of anhydrous potassium carbonate, 15.5 g. of ethyl tosylate in 45 ml. of dimethylformamide, two recrystallizations from acetonitrile and one recrystallization from isopropyl acetate.

52B. 1-Ethyl-1,4-dihydro-7-(3-methyl-4-pyridyl)-4-oxo-3-quinolinecarboxylic acid hydrochloride 560 mg., m.p. 284°–287°C. with decomposition, was prepared as in Example 8B using 1.02 g. of ethyl 1-ethyl-1,4-dihydro-7-(3-4-pyridyl)-4-oxo-3-quinolinecarboxylate, 5.0 ml. of concentrated hydrochloric acid, 15 ml. of water, a reflux period of three hours and two recrystallizations from ethanol-ether.

The intermediate ethyl 1,4-dihydro-7-(3-methyl-4-pyridyl)-4-oxo-3-quinolinecarboxylate used in Example 52A was prepared in six steps starting with 1-(2-furyl)-3-(3-nitrophenyl)-2-propen-1-one as described below in Examples 52C through 52H.

52C. 2,6-Bis(2-furyl)-3-methyl-4-(3-nitrophenyl)-pyridine

A mixture containing 341 g. of 1-(2-furyl)-3-(3-nitrophenyl)-2-propen-1-one, 174.1 g. of 2-(n-propanoyl) furan, 1,050 g. of ammonium acetate and 2,800 ml. of acetic acid was refluxed with stirring for 90 minutes, allowed to cool somewhat and evaporated in vacuo to yield an oily solid residue which crystallized on cooling. To the crystalline residue was added four liters of water and the mixture was extracted with chloroform. The chloroform solution was evaporated in vacuo to remove the chloroform and the resulting solid residue was recrystallized twice from acetonitrile to yield 119.1 g. of 2,6-bis(2-furyl)-3-methyl-4-(3-nitrophenyl)pyridine, m.p. 199°–201.5°C.

52D. 3-Methyl-4-93-nitrophenyl)-2,6-pyridine-dicarboxylic acid

To a boiling solution containing 52.5 ml. of nitric acid, 77.5 ml. of water and 125 mg. of ammonium vanadate was added slowly with stirring 5.0 g. of 2,6-bis-(2-furyl)-3-methyl-4-(3-nitrophenyl)pyridine followed by 52.5 ml. of nitric acid, 77.5 ml. of water and 125 mg. of ammonium vanadate. Boiling of the reaction mixture was continued until a brown vapor was no longer produced. The small amount of black solid was separated and the reaction solution was evaporated to dryness. A 200 ml. portion of water was added to the residue and the water was evaporated off. The residue was treated with a small amount of water and the solid was collected and taken up with dilute aqueous ammonium hydroxide. Hydrochloric acid was added to the solution and the solid that separated was collected, washed with water and then a small volume of acetone, and dried to yield 2.99 g. of 3-methyl-4-(3-nitrophenyl)-2,6-pyridinedicarboxylic acid, m.p. 232°–235°C. with decomposition.

52E. 3-Methyl-4-(3-nitrophenyl)pyridine

A mixture containing 2.49 g. of 3-methyl-4-(3-nitrophenyl)-2,6-pyridinedicarboxylic acid and 30 ml. of Dowtherm A was heated at 220°C. whereupon a vigorous evolution of gas (carbon dioxide) ensued. Heating at 220°C. was continued for about thirty minutes until the evolution of gas stopped. The reaction mixture was allowed to cool and was filtered. The filtrate was extracted with 3N hydrochloric acid. The acidic extract was washed with ether and basified with ammonium hydroxide. The resulting yellow precipitate was extracted with methylene dichloride. The extract was concentrated in vacuo to yield a yellow oil which crystallized on cooling. The crystalline material was recrystallized from isopropyl alcohol to yield 1.55 g. of 3-methyl-4-(3-nitrophenyl)pyridine, m.p. 87°–89°C.

52F. 4-(3-Aminophenyl)-3-methylpyridine 15.83 g., m.p. 128°–130°C., was obtained by catalytic hydrogenation as in Example 8G using 23.4 g. of 3-methyl-4-(3-nitrophenyl) pyridine, 200 ml. of dimethylformamide, 2.0 g. of 10% palladium-on-charcoal and recrystallization from isopropyl acetate. Second and third crops of 2.1 g. and 0.61 g. melting respectively at 126°–129°C. and 125°–128°C. also were obtained.

52G. Diethyl 3-(3-methyl-4-pyridyl)anilinomethylenemalonate 23.6 g., m.p. 87°–90°C., was prepared as in Example 8H using 18.1 g. of 4-(3-aminophenyl)-3-methylpyridine, 21.6 g. of diethyl ethoxymethylenemalonate and recrystallization from ether-n-hexane.

52H. Ethyl 1,4-dihydro-7-(3-methyl-4-pyridyl)-4-oxo-3-quinolinecarboxylate 15.9 g., was prepared as in Example 8I using 26.1 g. of diethyl 3-(3-methyl-4-pyridyl)-anilinomethylenemalonate, 260 ml. of Dowtherm A and a boiling period of 20 minutes.

53. 7-(2,6-Dimethyl-4-pyridyl)-1,4-dihydro-4-oxo-3-quinolinecarboxylic acid

A mixture containing 20 g. of ethyl 7-(2,6-dimethyl-4-pyridyl)-1,4-dihydro-4-oxo-3-quinolinecarboxylate, 6 g. of sodium hydroxide, 200 ml. of water and 50 ml. of methanol was heated with stirring on a steam bath for one hour. Decolorizing charcoal was added to the heated reaction mixture which was then filtered. The filtrate was heated on a steam bath and the heated solution acidified with acetic acid. The precipitate was collected and the residue was washed with distilled water and methanol to yield 13.5 g. of 7-(2,6-dimethyl-4-pyridyl)-1,4-dihydro-4-oxo-3-quinolinecarboxylic acid, m.p. >300°C.

54. 1,4-Dihydro-4-oxo-7-(4-pyridyl)-3-quinolinecarboxylic acid

A mixture containing 17 g. of ethyl 1,4-dihydro-4-oxo-7-(4-pyridyl)-3-quinolinecarboxylate, 300 ml. of water and 25 ml. of 35% aqueous sodium hydroxide solution was refluxed with stirring until a clear solution resulted. The source of heat was removed and 30 ml. of glacial acetic acid was added dropwise with stirring over a period of about ten minutes. The precipitate was collected from the hot mixture, washed with warm water, washed several times with methanol, recrystallized from dimethylformamide, washed successively with dimethylformamide and methanol, and dried in vacuo at 80°C. for five hours to yield 12 g. of 1,4-dihydro-4-oxo-7-(4-pyridyl)-quinolinecarboxylic, m.p. > 300°C.

55A. 1-Ethyl-1,4-dihydro-7-(2-methyl-5-pyridyl)-4-oxo-3-quinolinecarboxylic acid hydrochloride 2.3 g., m.p. 277°–280°C. with decomposition, was prepared stepwise as in Examples 8A and 8B by first using 9.2 g. of ethyl 1,4-dihydro-7-(2-methyl-5-pyridyl)-4-oxo-3-quinolinecarboxylate, 75 ml. of dimethylformamide, 8.3 g. of anhydrous potassium carbonate and 5.1 g., of diethyl sulfate to yield ethyl 1-ethyl-1,4-dihydro-7-(2-methyl-5-pyridyl)-3-quinolinecarboxylate, which was then converted to the corresponding 3-quinolinecarboxylic acid hydrochloride using 30 ml. of dilute hydrochloric acid as in Example 8B.

The intermediate ethyl 1,4-dihydro-7-(2-methyl-5-pyridyl)-4-oxo-3-quinolinecaraboxylate used in Example 55A was prepared in two steps as described hereinbelow in Examples 55B and 55C.

55B. Diethyl 3-(2-methyl-5-pyridyl)anilinomethylenemalonate 16.6 g., was prepared as in Example 8H using 8.5 g. of 5-(3-aminophenyl)-2-methylpyridine and 10.0 g. of diethyl ethoxymethylenemalonate. The crystalline intermediate was used directly in Example 55F.

The above 5-(3-aminophenyl)-2-methylpyridine can be prepared according to the known two-step procedure of Haworth et al. (J. Chem. Soc. 1940, page 349) in preparing 4-(3-aminophenyl)pyridine but using corresponding molar equivalent quantities of 3-nitrophenyldiazonium chloride and 3-methylpyridine to obtain 2-methyl-5-(3-nitrophenyl)pyridine and then reducing this nitro compound with stannous chloride and concentrated hydrochloric acid to yield 5-(3-aminophenyl)-2-methylpyridine.

55C. Ethyl 1,4-dihydro-7-(2-methyl-5-pyridyl)-4-oxo-3-quinolinecarboxylate 9.2 g., was prepared as in Example 8I using 16.6 g. of diethyl 3-(2-methyl-5-pyridyl) anilinomethylenemalonate, 170 ml. of Dowtherm A and two volumes of ethanol to dilute the cooled reaction mixture. The collected solid was washed with ether, dried in vacuo and used directly in Example 55A.

56A. Ethyl 1-ethyl-1,4-dihydro-6-methoxy-7-(2,6-dimethyl-4-pyridyl)-4-oxo-3-quinolinecarboxylate 18.5 g., m.p. 195°–197°C., was prepared as in Example 5A using 22 g. of ethyl 1,4-dihydro-6-methoxy-7-(2,6-dimethyl-4-pyridyl)-4-oxo-3-quinonlinecarboxylate, 25 g. of anhydrous potassium carbonate, 200 ml. of dimethylformamide, 5.8 ml. of ethyl iodide and crystallization from isopropyl alcohol n-hexane.

56B. 1-Ethyl-1,4-dihydro-6-methoxy-7-(2,6-dimethyl-4-pyridyl)-4-oxo-3-quinolinecarboxylic acid 15.3 g., m.p. >320°C. with decomposition, was prepared as in Example 5A using 18 g. of ethyl 1-ethyl 1,4-dihydro-6-methoxy-7-(2,6-dimethyl-4-pyridyl)-4-oxo-3-quinolinecarboxylate, 200 ml. of 5% aqueous sodium hydroxide solution, heating the mixture on a steam bath for two hours, filtering the reaction mixture, acidifying the cooled filtrate with acetic acid, collecting the solid, washing it with water and then drying it in vacuo at 80°C.

The above intermidiate ethyl 1,4-dihydro-6-methoxy-7-(2,6-dimethyl-4-pyridyl)-4-oxo-3-quinolinecarboxylate used un Example 56A was prepared in seven steps starting with 2-methoxy-5-nitrobenzaldehyde as described hereinbelow in Examples 56C through 56I.

56C. Dimethyl 1,4-dihydro-4-(2-methoxy-5-nitrophenyl)-2,6-dimethyl-3,5-pyridinedicarboxylate 70.5 g., m.p. 202°–205°C., was prepared as in Example 45C using 102 g. of 2-methoxy-5-nitrobenzaldehyde, 300 ml. of methanol, 132 g. of methyl acetoacetate and 50 ml. of concentrated ammonium hydroxide.

56D. Dimethyl 4-(2-methoxy-5-nitrophenyl)-2,6-dimethyl-3,5-pyridinedicarboxylate 110.5 g., m.p. 166°–168°C., was prepared as in Example 45D using 133 g. of dimethyl 1,4-dihydro-4-(2-methoxy-5-nitrophenyl)-2,6-dimethyl-3,5-pyridinedicarboxylate, 1,300 ml. of 4N nitric acid, basifying the reaction mixture with ammonium hydroxide, collecting the solid product, washing it with water, drying it and recrystallizing it from isopropyl alcohol.

56E. 4-(2-Methoxy-5-nitrophenyl)-2,6-dimethyl-3,5-pyridinedicarboxylic acid 110.5 g., m.p. >280°C. with decomposition, was prepared as in Example 45E, using 140 g. of dimethyl 4-(2-methoxy-5-nitrophenyl)-2,6-dimethyl-3,5 pyridinedicarboxylate, 200 ml. of methanol, 200 ml. of 35% aqueous sodium hydroxide solution, a refluxing period of two and one-half hours, allowing the reaction mixture to stand for an additional fifteen hours and isolating the product as in Example 45E.

56F. 4-(2-Methoxy-5-nitrophenyl)-2,6-dimethylpyridine 45.5 g., m.p. 165°–167°C., was prepared as in Example 45F using 107 g. of 4-(2-methoxy-5-nitrophenyl)-2,6-dimethyl-3,5-pyridinedicarboxylic acid, 1500 ml. of Dowtherm A and crystallization from isopropyl alcohol-n-hexane.

56G. 4-(5-Amino-2-methoxyphenyl)-2,6-dimethylpyridine hydrochloride 45.2 g., m.p. >250°C. with decomposition, was prepared as in Example 45G using 50 g. of 4-(2-methoxy-5-nitrophenyl)-2,6-dimethylpyridine, 200 ml. of acetic acid, 0.7 g. of platinum oxide and crystallization from isopropyl alcohol.

56H. Diethyl 4-methoxy-3-(2,6-dimethyl-4-pyridyl)-anilinomethylenemolonate 47 g., m.p. 133°–135°C., was prepared as in Example 45H using 37 g. of 4-(5-amino-2-methoxyphenyl)-2,6-dimethylpyridine hydrochloride, 48 g. of diethyl ethoxymethylenemalonate, a heating period of two hours at 100°–120°C. and crystallization from isopropyl alcohol-n-hexane.

56I. Ethyl 1,4-dihydro-6-methoxy-7-(2,6-dimethyl-4-pyridyl)-4-oxo-3-quinolinecarboxylate 31.4 g., m.p. >290°C. with decomposition, was prepared as in Example 45I using 42 g. of diethyl 4-methoxy-3-(2,6-dimethyl-4-pyridyl)-anilinomethylenemalonate, 500 ml. of Dowtherm A and recrystallization from dimethylformamide.

57A. 7-(3,5-Dicarboxy-2,6-dimethyl-4-pyridyl)-1-ethyl-6-fluoro-1,4-dihydro-4-oxo-3-quinolinecarboxylic acid, 27.5 g., m.p. >290°C. with decomposition, was prepared stepwise as described in Examples 45A and 45B first using 46 g. of ethyl 7-(3,5-dicarbomethoxy-2,6-dimethyl-4-pyridyl)-6-fluoro-1,4-dihydro-4-oxo-3-quinolinecarboxylate, 40 g. of anhydrous potassium carbonate, 300 ml. of dimethylformamide and 10 ml. of ethyl iodide to yield ethyl 7-(3,5-dicarbomethoxy-2,6-dimethyl-4-pyridyl)-1-ethyl-6-fluoro-1,4-dihydro-4-oxo-3-quinolinecarboxylate which was then hydrolyzed as in Example 45B using 200 ml. of 2N aqueous sodium hydroxide solution and a heating period of two hours.

The intermediate ethyl 7-(3,5-dicarbomethoxy-2,6-dimethyl-4-pyridyl)-6-fluoro-1,4-dihydro-4-oxo-3-quinolinecarboxylate used in Example 57A was prepared in five steps starting with 2-fluoro-5-nitrobenzaldehyde as described below in Examples 57B through 57F.

57B. Dimethyl 4-(2-fluoro-5-nitrophenyl)-1,4-dihydro-2,6-dimethyl-3,5-pyridinedicarboxylate 105 g., m.p. 175°–180°C., was prepared as in Example 45C using 91 g. of 2-fluoro-5-nitrobenzaldehyde, 152 g. of methyl acetoacetate, 300 ml. of methanol, 120 ml. of concentrated ammonium hydroxide and a refluxing period of three hours.

57C. Dimethyl 4-(2-fluoro-5-nitrophenyl)-2,6-dimethyl-3,5-pyridinedicarboxylate 110.5 g., m.p. 95°–97°C., was prepared as described in Example 45D using 121 g. of dimethyl 4-(2-fluoro-5-nitrophenyl)-1,4-dihydro-2,6-dimethyl-3,5-pyridinedicarboxylate, 1200 ml. of 4N nitric acid and crystallization from ether.

57D. Dimethyl 4-(5-amino-2-fluorophenyl)-2,6-dimethyl-3,5-pyridinedicarboxylate 50 g., m.p. 123°–125°C., was catalytically hydrogenated as in Example 45G using 66 g. of dimethyl 4-(2-fluoro-5-nitrophenyl)-1,4-dihydro-2,6-dimethyl-3,5-pyridinedicarboxylate, 150 ml. of acetic acid, 0.5 g. of platinum oxide and crystallization from n-hexane-isopropyl alcohol.

N-(Lower-alkanoyl) derivatives of the above amine are readily prepared by reaction with a lower-alkanoic anhydride in the presence of a base, e.g., pyridine, as illustrated in the following preparation of the N-acetyl compound: A solution containing 74 g. of dimethyl 4-(5-amino-2-fluorophenyl)-2,6-dimethyl-3,5-pyridinedicarboxylate, 200 ml. of pyridine and 200 ml. of acetic anhydride was allowed to stand overnight (about fifteen hours) at room temperature and then poured onto crushed ice. After the ice had melted, the white filtrate was collected, washed with water and dried to yield 73 g. of dimethyl 4-(5-acetamido-2-fluororphenyl)-2,6-dimethyl-3,5-pyridinedicarboxylate, m.p. 139°–141°C.

57E. Diethyl 3-(3,5-dicarbomethoxy-2,6-dimethyl-4-pyridyl)-4-fluoroanilinomethylenemalonate 13.5 g., m.p. 100°–102°C., was prepared as in Example 45H using 9.6 g. of 4-(5-amino-2-fluorophenyl)-2,6-dimethyl-3,5-pyridinedicarboxylate, 7 g. of diethyl ethoxymethylenemalonate and crystallization from isopropyl alcohol-n-hexane.

57F. Ethyl 6-(3,5-dicarbomethoxy-2,6-dimethyl-4-pyridyl)-6-fluoro-1,4-dihydro-4-oxo-3-quinolinecarboxylate 53 g., m.p. 248°–250°C., was prepared as in Example 45I using 70 g. of diethyl 3(3,5-dicarbomethoxy-2,6-dimethyl-4-pyridyl-4-fluoroanilinomethylenemalonate, 50 ml. of Dowtherm A and recrystallization from isopropyl alcohol.

58. Pivaloyloxymethyl 1-ethyl-1,4-dihydro-4-oxo-7-(4-pyridyl)-3-quinolinecarboxylate A mixture containing 14.7 g. of 1-ethyl-1,4-dihydro-4-oxo-7-(4-pyridyl)-3-quinolinecarboxylic acid, 15.1 g. of chloromethyl pivalate, 15 g. of potassium bicarbonate and 125 ml. of dimethylformamide was heated on a steam bath for one hour. The reaction mixture was poured into about 500 ml. of ice and water, and the aqueous layer was extracted with chloroform. The chloroform extract was washed twice with water, dried over anhydrous potassium carbonate, treated with decolorizing charcoal and filtered. The filtrate was concentrated in vacuo to remove the chloroform. The solid residue was recrystallized from ethyl acetate using decolorizing charcoal, washed well with isopropyl acetate and dried at 60°C., in vacuo for four hours to yield 11.5 g. of pivaloyloxymethyl 1-ethyl-1,4-dihydro-4-oxo-7-(4-pyridyl)-3-quinolinecarboxylate, m.p. 188°–190°C.

59. Benzoyloxymethyl 1-ethyl-1,4-dihydro-4-oxo-7-(4-pyridyl)-3-quinolinecarboxylate 10 g., m.p. 159°–160°C., was prepared as in Example 58 using 14.7 g. of 1-ethyl-1,4-dihydro-4-oxo-7-(4-pyridyl)-3-quinolinecarboxylic acid, 15.0 g. of potassium bicarbonate, 15 ml. of chloromethyl benzoate, 125 ml. of dimethylformamide, one crystallization from ethyl acetate and one from isopropyl alcohol using decolorizing charcoal.

60. Ethyl 1-ethyl-1,4-dihydro-7-(1,2-dihydro-1-methyl-2-oxo-4-pyridyl)-4-oxo-3-quinolinecarboxylate To a suspension containing 21.4 g. of 4-(3-carbethoxy-1-ethyl-1,4-dihydro-4-oxo-7-quinolyl)-1-methylpyridinium iodide in 100 ml. of cold water was added 32.9 g. of potassium ferricyanide in 100 ml. of cold water and 8.0 g. of sodium hydroxide in 25 ml. of water, ice being added to keep the reaction temperature between 0° and 5°C. The cold reaction mixture was stirred for one hour and then extracted three times with chloroform. The chloroform extract was washed with saturated brine solution and dried over anhydrous magnesium sulfate. The chloroform solution was evaporated to yield a yellow solid which was recrystallized from about 50 ml. of acetonitrile to yield 1.2 g. of ethyl 1-ethyl-1,4-dihydro-7-(1,2-dihydro-1-methyl-2-oxo-4-pyridyl)-4-oxo-3-quinolinecarboxylate, m.p. 208°–210°C.

61. 1-Ethyl-1,4-dihydro-5-methyl-7-(2-methyl-4-pyridyl)-4-oxo-3-quinolinecarboxylic acid A mixture containing 3 g. of 1-ethyl-1,4-dihydro-5-methyl-4-oxo-7-(4-pyridyl)-3-quinolinecarboxylic acid, 3 g. of Raney nickel and 105 ml. of decanal was heated at 190°C. with stirring for 12 hours, cooled to room temperature and filtered. The filtrate was extracted with three 30 ml. portions of concentrated hydrochloric acid. The remaining aqueous layer was made basic with ammonium hydroxide and then extracted with chloroform. The aqueous mother liquor was evaporated to dryness to yield an oil which was dissolved in 50 ml. of methanol and 20 ml. of 2N aqueous potassium hydroxide solution and the resulting solution was refluxed for one hour. The methanol was removed in vacuo, the residue was partitioned between water and chloroform. The aqueous layer was separated, acidified with acetic acid and the acidic solution cooled in an ice bath. The resulting crystalline precipitate was collected, dried and found to yield 1.1 g. of 1-ethyl-1,4-dihydro-5-methyl-7-(2-methyl-4-pyridyl)-4-oxo-3-quinolinecarboxylic acid, m.p. 152°–155°C.

62A. Ethyl 1-ethyl-1,4-dihydro-7-(2-methoxy-6-methyl-4-pyridyl)-4-oxo-3-quinolinecarboxylate 10.5 g., m.p. 171°–173°C., was prepared following the procedure described in Example 2 using 37 g. of ethyl 1,4-dihydro-7-(2-methoxy-6-methyl-4-pyridyl)-4-oxo-3-quinolinecarboxylate, 450 ml. of dimethylformamide, 45 g. of anhydrous potassium carbonate, 18 g. of diethyl sulfate, and successive recrystallizations from isopropyl alcohol, acetonitrile (using decolorizing charcoal), methanol and ethanol.

The above intermediate ethyl 1,4-dihydro-7-(2-methoxy-6-methyl-4-pyridyl)-4-oxo-3-quinolinecarboxylate was prepared in four steps starting with 2-hydroxy-6-methyl-4-(3-nitrophenyl)pyridine as described hereinbelow in Examples 62C–62F. The ethyl ester of Example 62A was readily hydrolyzed to produce the corresponding 3-quinolinecarboxylic acid as described in Example 62B.

62B. 1-Ethyl-1,4-dihydro-7-(2-methoxy-6-methyl-4-pyridyl)-4-oxo-3-quinolinecarboxylic acid A mixture containing 10.5 g. of ethyl 1-ethyl-1,4-dihydro-7-(2-methoxy-6-methyl-4-pyridyl)-4-oxo-3-quinolinecarboxylate, 50 ml. of 5% aqueous sodium hydroxide solution and 30 ml. of ethanol was heated on a steam bath with stirring for about 10 minutes, filtered and the hot filtrate acidified with acetic acid. The resulting white precipitate was collected, washed well with water, recrystallized from dimethylformamide, collected, washed with acetonitrile and dried in vacuo at 50°C. to yield 7.9 g. of 1-ethyl-1,4-dihydro-7-(2-methoxy-6-methyl-4-pyridyl)-4-oxo-3-quinolinecarboxylic acid, m.p. 277°–278°C.

62C. 2-Methoxy-6-methyl-4-(3-nitrophenyl)pyridine

A mixture containing 37.3 g. of 2-hydroxy-6-methyl-4-(3-nitrophenyl)pyridine, 86 g. of silver carbonate, 1,500 ml. of tetrahydrofuran and 46 g. of methyl iodide was refluxed for nine hours with stirring and then allowed to stand overnight at room temperature. The precipitate was collected and washed successively with tetrahydrofuran and chloroform. The combined filtrate and washings were evaporated in vacuo to yield a tan solid. The solid was dissolved in about 800 ml. of boiling methanol and the solid concentrated to a volume of 300 ml. and allowed to cool. The resulting crystalline precipitate was dissolved in 500 ml. of dilute hydrochloric acid, and the aqueous solution extracted with chloroform. The aqueous layer was then made alkaline with aqueous sodium hydroxide solution. The resulting white precipitate was dissolved in chloroform, the chloroform solution dried over anhydrous magnesium sulfate and the chloroform distilled off in vacuo to leave 17.8 g. of 2-methoxy-6-methyl-4-(3-nitrophenyl)pyridine, m.p. 115°–116°C.

62D. 4-(3-Aminopyridyl)-2-methoxy-6-methylpyridine 21.3 g., a pale yellow oil, was prepared following the procedure described in Example 8G using 26.3 g. of 2-methoxy-6-methyl-4-(3-nitrophenyl)pyridine, 600 ml. of dimethylformamide and 2.6 g. of palladium-on-charcoal.

62E. Diethyl 3-(2-methoxy-6-methyl-4-pyridyl)-anilinomethylenemalonate 38 g., a waxy solid, was obtained following the procedure described in Example 8H using 20.8 g. of 4-(3-aminophenyl)-2-methoxy-6-methylpyridine and 21.6 g. diethyl ethoxymethylenemalonate.

62F. Ethyl 1,4-dihydro-7-(2-methoxy-6-methyl-4-pyridyl)-4-oxo-3-quinolinecarboxylate a tan solid, was obtained in quantitative yield following the procedure described in Example 8I using 37.4 g. of diethyl 3-(2-methoxy-6-methyl-4-pyridyl)-anilinomethylenemalonate and 400 ml. of Dowtherm A.

63A. Ethyl 1-ethyl-7-(2-ethyl-4-pyridyl)-1,4-dihydro-4-oxo-3-quinolinecarboxylate 3.5 g., m.p. 138.5°–140°C. was prepared following the procedure described in Example 2 using 8.05 g. of ethyl 7-(2-ethyl-4-pyridyl)-1,4-dihydro-4-oxo-3-quinolinecarboxylate, 100 ml. dimethylformamide, 7 g. of anhydrous potassium carbonate, 2.35 ml. of ethyl iodide and recrystallization from ethyl acetate.

The above intermediate ethyl 7-(2-ethyl-4-pyridyl)-1,4-dihydro-4-oxo-3-quinolinecarboxylate was prepared in nine steps starting with 3-nitrobenzaldehyde as described hereinbelow in Example 63C–63K.

The above 3-quinolinecarboxylate of Example 63A was readily converted into its corresponding 3-quinolinecarboxylic acid by acid hydrolysis as described in Example 63B.

62B. 1Ethyl-7-(2-ethyl-4-pyridyl)-1,4-dihydro-4-oxo-3-quinolinecarboxylic acid A solution containing 13.4 g. of ethyl 1-ethyl-7-(2-ethyl-4-pyridyl)-1,4-dihydro-4-oxo-3-quinolinecarboxylic acid and 60 ml. of 6N hydrochloric acid was heated with stirring on a steam bath. After about thirty minutes, the solid began to separate. After ninety minutes the reaction mixture was diluted with water and concentrated hydrochloric acid (in quantities to produce 6N hydrochloric acid) to a volume of about 120 ml.; heating on the steam bath was continued with stirring for a total of about five and one-half hours. The reaction mixture was concentrated in vacuo to dryness and the crystalline residue was washed successively with water and acetone, and then dried in vacuo at 80°C. to yield 11.8 g. of 1-ethyl-7-(2-ethyl-4-pyridyl)-1,4-dihydro-4-oxo-3-quinolinecarboxylic acid hydrochloride, m.p. 305°C. with decomposition.

63C. α-Cyano-β-(3-nitrophenyl)acrylamide

A 176 g. portion of cyanoacetamide was dissolved in 1.4 liters of ethanol by warming. To this solution was added 302 g. of 3-nitrobenzaldehyde and the resulting solution was filtered through infusorial earth and the filter cake was washed with 200 ml. of hot ethanol. To the filtrate was added with stirring 15 ml. of piperidine and the resulting mixture was stirred for two hours at 40°C. The mixture containing some separated solids was chilled (to about 20°C.); the separated solid was collected, washed with ethanol and used as such in Example 63D. A small sample of this intermediate, α-cyano-β-(3-nitrophenyl)acrylamide, was dried in vacuo at 50°C. and found to melt at 154°–156°C.

63D. Ethyl 4-cyano-3-(3-nitrophenyl)-2-propionylglutaramate

To a solution containing 274 g. of ethyl propioacetate in 2500 ml. of ethanol was added the α-cyano-β-(3-nitrophenyl)acrylamide of Example 63C with stirring. To the stirred reaction mixture heated to 45°C. was added 20 ml. of piperidine whereupon the reaction mixture soon filled with a white solid while the reaction temperature rose to about 62°C. After allowing reaction mixture to stand for about thirty minutes with occasional stirring, the solid was collected and washed successively with ethanol and ether. The solid was dried in vacuo at 40°C. to yield 524 g. of ethyl 4-cyano-3-(3-nitrophenyl)-2-propionylglutaramate.

63E. Ethyl 5-cyano-2-ethyl-1,4,5,6-tetrahydro-4-(3-nitrophenyl)-6-oxonicotinate A very thick suspension containing 71.5 g. of ethyl 4-cyano-3-(3-nitrophenyl)-2-propionylglutaramate, 350 ml. of acetic acid and 400 ml. of concentrated sulfuric acid was stirred for three hours at ambient temperature (about 35°C.). The resulting mixture was cooled in an ice bath with stirring and the solid was collected. The solid was triturated three times with water, washing with 50 ml. of methanol and dried in vacuo at 55°C. to yield 57.6 g. of ethyl 5-cyano-2-ethyl-1,4,5,6-tetrahydro-4-(3-nitrophenyl)-6-oxonicotinate, m.p. 174°–176°C.

63F. Ethyl 5-cyano-2-ethyl-5,6-dihydro-4-(3-nitrophenyl)-6-oxonicotinate

To 100 ml. of thionyl chloride was added with stirring 13.7 g. of ethyl 5-cyano-2-ethyl-1,4,5,6-tetrahydro-4-(3-nitrophenyl)-6-oxonicotinate and the resulting reaction mixture was refluxed for ninety minutes and concentrated in vacuo to remove most of the excess thionyl chloride. The residual solution was poured into water with stirring and the separated solid was collected, washed with water and dissolved in chloroform. The chloroform solution was washed with water, dried over anhydrous sodium sulfate, the mixture filtered and the filtrate concentrated in vacuo to remove the solvent. The residual material was crystallized from acetone and then recrystallized from acetone to yield ethyl 5-cyano-2-ethyl-5,6-dihydro-4-(3-nitrophenyl)-6-oxonicotinate, m.p. 185°–190°C.

63G. 6-Ethyl-4-(3-nitrophenyl)-2(1H)-pyridone

A mixture containing 222 g. of ethyl 5-cyano-2-ethyl-5,6-dihydro-5-(3-nitrophenyl)-6-oxonicotinate, 1,600 ml. of concentrated sulfuric acid and 1,500 ml. of water was refluxed vigorously with stirring for two hours. To the reaction mixture was added 250 ml. each of concentrated sulfuric acid and water and refluxed with stirring for an additional four hours. The reaction mixture was poured into cold water with stirring. The solid that separated was collected and washed successively with water, acetone (sparingly) and finally ether, and dried to yield 136 g. of 6-ethyl-4-(3-nitrophenyl)-2(1H)-pyridone, m.p. 222°–223°C. A sample of this compound was recrystallized from dimethylformamide and dried in vacuo at 65°C. and melted at 223°–224°C.

63H. 2-Chloro-6-ethyl-4-(3-nitrophenyl)pyridine, 136.5 g., m.p. 111°–113°C., was prepared following the procedure in Example 49D using 135 g. of 6-ethyl-4-(3-nitrophenyl)-2(1H)-pyridone, 325 ml. of phenylphosphonic dichloride, recrystallization from ethanol using decolorizing charcoal and drying in vacuo at 60°C.

63I. 4-(3-Aminophenyl)-2-ethylpyridine 46.0 g., m.p. 60°–61°C., was obtained following the catalytic hydrogenation procedure of Example 49E using 88.5 g. of 2-chloro-6-ethyl-4-(3-nitrophenyl)pyridine, 230 ml. of dimethylformamide, 10.0 g. of 10% palladium-on-charcoal and crystallization from n-hexane.

63J. Diethyl 3-(2-ethyl-4-pyridyl)anilinomethylenemalonate 96.3 g., m.p. 69°–71°C., was obtained following the procedure described in Example 1C, using 58.7 g. of 4-(3-aminophenyl)-2-ethylpyridine, 65.0 g. of diethyl ethoxymethylenemalonate, and recrystallization from n-hexane.

63K. Ethyl 7-(2-ethyl-4-pyridyl)-1,4-dihydro-4-oxo-3-quinolinecarboxylate 34 g., was obtained following the procedure described in Example 1D using 48 g. of diethyl 3-(2-ethyl-4-pyridyl)anilinomethylenemalonate and 2000 ml. of Dowtherm A. This compound was converted into its hydrochloride salt as follows: A 14.3 g. portion of ethyl 7-(2-ethyl-4-pyridyl)-1,4-dihydro-4-oxo-3-quinolinecarboxylate was added with stirring to 70 ml. of 6N hydrochloric acid followed by the addition of 400 ml. cold water with stirring. The separated solid was collected, washed successively with water and ethanol, triturated with acetone and dried in vacuo at 70°C. to yield 11.1 g. of ethyl 7-(2-ethyl-4-pyridyl)-1,4-dihydro-4-oxo-3-quinolinecarboxylate hydrochloride, m.p. 245°C. with decomposition.

64A. Ethyl 7-(3,5-dicarbomethoxy-2,6-dimethyl-4-pyridyl)-1-ethyl-1,4-dihydro-6-methyl-4-oxo-3-quinolinecarboxylate, 35.6 g., m.p. 159°–165°C., was prepared following the procedure described in Example 8A using 60 g. of ethyl 7-(3,5-dicarbomethoxy-2,6-dimethyl-4-pyridyl)-1,4-dihydro-6-methyl-4-oxo-3-quinolinecarboxylate, 30 g. of anhydrous potassium carbonate, 400 ml. of dimethylformamide, 12 ml. of ethyl iodide and recrystallization from ether-n-hexane.

64B. 7-(3,5-Dicarboxy-2,6-dimethyl-4-pyridyl)-1-ethyl-1,4-dihydro-6-methyl-4-oxo-3-quinolinecarboxylic acid, 29.5 g., m.p. >290°C. with decomposition, was prepared by heating on a steam bath for three hours a mixture containing 35 g. of ethyl 7-(3,5-dicarbomethoxy-2,6-dimethyl-4-pyridyl)-1-ethyl-1,4-dihydro-6-methyl-4-oxo-3-quinolinecarboxylate, 100 ml. of methanol, 50 ml. of 35% aqueous sodium hydroxide solution and 200 ml. of water; evaporating off the methanol; cooling the aqueous reaction mixture and then making it acidic with hydrochloric acid; and, collecting the precipitate, washing it with water and drying it in vacuo at 50°C.

64C. 1-Ethyl-1,4-dihydro-6-methyl-7-(2,6-dimethyl-4-pyridyl)-4-oxo-3-quinolinecarboxylic acid 5.7 g., m.p. >300°C., was prepared by heating a mixture of 26.5 g. of 7-(3,5-dicarboxy-2,6-dimethyl-4-pyridyl)-1-ethyl-1,4-dihydro-6-methyl-4-oxo-3-quinolinecarboxylic acid and 350 ml. of diethyl phthalate with stirring at 240°–255°C. for 30 minutes; cooling the reaction mixture to room temperature; diluting it with ether; chilling the mixture in an ice bath; and, then collecting said compound as a white crystalline material.

64D. Dimethyl 1,4-dihydro-2,6-dimethyl-4-(2-methyl-5-nitrophenyl)-3,5-pyridinecarboxylate 9.1 g., m.p. 164°–166°C., was prepared following the procedure described in Example 45C using 19 g. of 2-methyl-5-nitrobenzaldehyde, 50 ml. of methanol, 27 g. of methyl acetoacetate, 10 ml. of concentrated ammonium hydroxide and recrystallization from isopropyl alcohol-n-hexane followed by drying in vacuo at 70°C.

64E. Dimethyl 2,6-dimethyl-4-(2-methyl-5-nitrophenyl)-3,5-pyridinedicarboxylate 26.5 g., m.p. 128°–130°C., was prepared following the procedure described in Example 45D using 124 g. of dimethyl 1,4-dihydro-2,6-dimethyl-4-(2-methyl-5-nitrophenyl)-3,5-pyridinedicarboxylate, 1250 ml. of 4N nitric acid, acidifying the reaction mixture with ammonium hydroxide, collecting the solid product, washing it with water, drying it and recrystallizing it from isopropyl alcohol-n-hexane.

64F. Dimethyl 2,6-dimethyl-4-(5-amino-2-methylphenyl)-3,5-pyridinedicarboxylate 82.5 g., m.p. 95°–97°C., was prepared following the catalytic hydrogenation procedure described in Example 45G using 125 g. of dimethyl 2,6-dimethyl-4-(2-methyl-5-nitrophenyl)-3,5-pyridinedicarboxylate, 400 ml. of acetic acid, 1.5 g. of platinum oxide and crystallization from isopropyl alcohol-n-hexane.

64G. Diethyl 3-(3,5-dicarbomethoxy-2,6-dimethyl-4-pyridyl)-4-methylanilinomethylenemalonate was prepared in quantitative yield following the procedure described in Example 45H using 70 g. of dimethyl 2,6-dimethyl-4-(5-amino-2-methylphenyl)-3,5-pyridinedicarboxylate, 55 g. of diethyl ethoxymethylenemalonate, 100 ml. of ethanol as solvent, a heating period of three hours on a steam bath, and isolation of the compound as an oily material after removal of the solvent in vacuo. 64H. Ethyl 1,4-dihydro-7-[3,5-bis(carbomethoxy)-2,6-dimethyl-4-pyridyl]-6-methyl-4-oxo-3-quinolinecarboxylate 72.5 g., m.p. 152°–155°C., was prepared following the procedure described in Example 45I using 128 g. of diethyl 3-(3,5-dicarbomethoxy-2,6-dimethyl-4-pyridyl)-4-methylanilinomethylenemalonate, 700 ml. of Dowtherm A and recrystallization from isopropyl alcohol-n-hexane.

Following procedures described hereinabove and using molar equivalent quantities of the corresponding appropriate reactants, the following compounds of Examples 65–74 are obtained:

65. Pivaloyloxymethyl 1-ethyl-1,4-dihydro-5-methyl-4-oxo-7-(4-pyridyl)-3-quinolinecarboxylate.
66. Pivaloyloxymethyl 1-ethyl-1,4-dihydro-5-methyl-7-(2-methyl-4-pyridyl)-4-oxo-3-quinolinecarboxylate.
67. Pivaloyloxymethyl 1-ethyl-1,4-dihydro-6-methyl-7-(2,6-dimethyl-4-pyridyl)-4-oxo-3-quinolinecarboxylate.
68. Benzoyloxymethyl 1-ethyl-1,4-dihydro-6-methoxy-7-(2,6-dimethyl-4-pyridyl)-4-oxo-3-quinolinecarboxylate.
69. Pivaloyloxymethyl 1-ethyl-1,4-dihydro-7-(2,6-dimethyl-4-pyridyl)-4-oxo-3-quinolinecarboxylate.
70. Acetoxymethyl 1-ethyl-1,4-dihydro-7-(2-methyl-4-pyridyl)-4-oxo-3-quinolinecarboxylate.
71. Benzoyloxymethyl 1-ethyl-1,4-dihydro-7-(2,6-dimethyl-4-pyridyl)-4-oxo-3-quinolinecarboxylate.
72. 7-(2-chloro-4-pyridyl)-1-ethyl-1,4-dihydro-5-methyl-4-oxo-3-quinolinecarboxylic acid.
73. 7-(2-Chloro-6-methyl-4-pyridyl)-1-ethyl-1,4-dihydro-5-methyl-4-oxo-3-quinolinecarboxylic acid.
74. Pivaloyloxymethyl 7-(2-chloro-4-pyridyl)-1-ethyl-1,4-dihydro-4-oxo-3-quinolinecarboxylate.

The actual determination of the numerical antibacterial data definitive for a particular compound of the invention is readily obtained by known standard test procedures by technicians versed in antibacterial test procedures, without any need for any extensive experimentation.

The compounds of the invention can be prepared for use by conventional pharmaceutical procedures: that is, by dissolving or suspending them in a pharmaceutically acceptable vehicle, e.g., aqueous alcohol, glycol, oil solution, or oilwater emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

We claim:
1. A compound selected from: 1-R$_1$-1,4-dihydro-3-(COOR)-4-oxo-5(or 6)-R'-7-PY-quinoline where R$_1$ is non-tertiary lower-alkyl, lower-hydroxyalkyl or lower-haloalkyl, R is hydrogen, non-tertiary lower-alkyl or CH$_2$OAc where Ac is lower-alkanol or benzoyl, R' is halo, non-tertiary lower-alkyl or lower-alkoxy or R' is hydrogen when R is CH$_2$OAc, and PY is Q-1-(O)$_n$-4(3 or 2)-pyridyl, Q-1-Q'-4(3 or 2)-piperidyl or 1-(lower-alkyl)-1,2-dihydro-2-oxo-4-pyridyl, where $n$ is zero of 1, Q is from zero to four substituents selected from non-tertiary lower-alkyl where two of four said substituents at the 3- and 5- positions of 4-pyridyl can be replaced by lowercarbalkoxy or carboxy, or Q is from one to two substituents selected from lower-alkoxy, halo, hydroxy, lower-alkanoyloxy, hydroxymethyl, formyl, carboxy and lower-carbalkoxy where one of the two said substituents can be replaced by non-tertiary lower-alkyl, or Q is a single substituent selected from aminomethyl, lower-alkanoylaminomethyl, amino, cyano and carbamyl, and Q' is hydrogen or non-tertiary lower-alkyl, where lower in each of lower-alkyl, lower-alkoxy, lower-alkanoyl and alkoxy of lower-carbalkoxy designates from one to six carbon atoms and in each of lowerhydroxyalkyl and lower-haloalkyl designates from two to six carbon atoms; and, a medicinally acceptable salt thereof.

2. A compound selected from: a compound of the formula

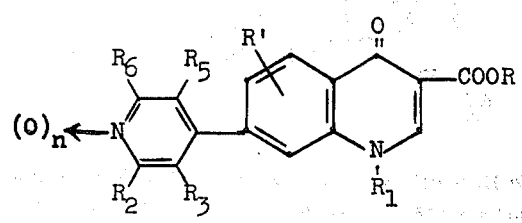

where R is hydrogen, non-tertiary lower-alkyl or CH$_2$OAc where Ac is lower-alkanoyl or benzoyl, R' is halo, non-tertiary lower-alkyl or lower-alkoxy or R' is hydrogen when R is CH$_2$OAc, R$_1$ is non-tertiary lower-alkyl, lower-hydroxyalkyl or lower-haloalkyl, n is zero or 1, and, R$_2$, R$_3$, R$_5$ and R$_6$ are each hydrogen, or from one to four substituents selected from non-tertiary lower-alkyl where R$_3$ and R$_5$ each can be lower-carbalkoxy or carboxy where R$_2$ and R$_6$ are each said lower-alkyl, or two of R$_2$, R$_3$, R$_5$ and R$_6$ are each hydrogen and at least one or both of the other two are substituents selected from lower-alkoxy, halo, hydroxy, lower-alkanoyloxy, hydroxymethyl, formyl, carboxy and lower-carbalkoxy where the second of two said substituents can be replaced by non-tertiary lower-alkyl, or three of R$_2$, R$_3$, R$_5$ and R$_6$ are each hydrogen and the other is a substituent selected from aminomethyl, lower-alkanoylaminomethyl, amino, cyano and carbamyl, where lower has the same designations given in Claim 1; and, a medicinally acceptable salt thereof.

3. 1-R$_1$-1,4-dihydro-3-(COOR)-4-oxo-5(or 6)-R'-7-PY-quinoline where R$_1$ is non-tertiary lower-alkyl or CH$_2$OAc where Ac is lower-alkanoyl or benzoyl, R' is halo, non-tertiary lower-alkyl or lower-alkoxy or R' is hydrogen when R is CH$_2$OAc, and PY is 4(or 3)-pyridyl or 4(or 3)-pyridyl having one to three non-tertiary lower-alkyl substituents or having two non-tertiary lower-alkyl substituents and two carboxy or lower-carbalkoxy substituents or having one non-tertiary lower-alkyl and one halo substituents or having one halo substituent, where lower alkyl, lower-alkoxy, lower-alkanoyl or alkoxy of lower-carbalkoxy each has from one to six carbon atoms; or a medicinally acceptable salt thereof.

4. A compound of the formula

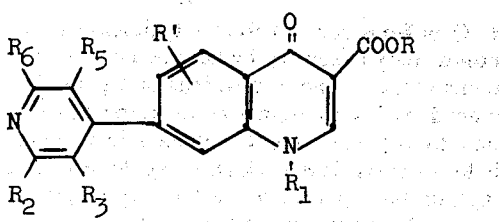

where $R_1$ is non-tertiary lower-alkyl, R is hydrogen or non-tertiary lower-alkyl, R' is halo, non-tertiary lower-alkyl or lower-alkoxy, $R_2$ and $R_6$ are each non-tertiary lower-alkyl, and, $R_3$ and $R_5$ are each carboxy or lower-carbalkoxy, where lower-alkyl, lower-alkoxy or alkoxy of lower-carbalkoxy each has from one to six carbon atoms; or a medicinally acceptable salt thereof.

5. A compound of the formula

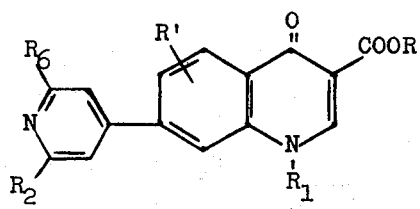

where $R_1$ is non-tertiary lower-alkyl, R is hydrogen or nontertiary lower-alkyl, R' is halo, non-tertiary lower-alkyl or lower-alkoxy, $R_2$ is hydrogen or non-tertiary lower-alkyl and $R_6$ is hydrogen, non-tertiary lower-alkyl or halo, where lower-alkyl, lower-alkoxy or alkoxy or lower-carbalkoxy each has from one to six carbon atoms; or a medicinally acceptable salt thereof.

6. A compound of the formula

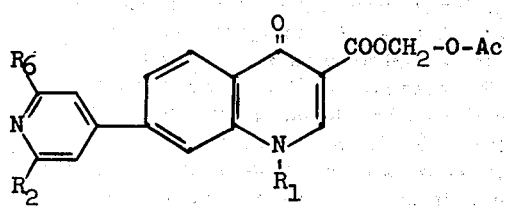

$R_1$ is non-tertiary lower-alkyl, $R_2$ and $R_6$ are each hydrogen or non-tertiary lower-alkyl, and Ac is lower-alkanoyl or benzoyl, where lower-alkyl and lower-alkanoyl each has from one to six carbon atoms; or a medicinally acceptable salt thereof.

7. 1-Ethyl-1,4-dihydro-5-methyl-4-oxo-7-(4-pyridyl)-3-quinolinecarboxylic acid according to claim 5 or a medicinally acceptable salt thereof.

8. 1-Ethyl-1,4-dihydro-5-methyl-7-(2-methyl-4-pyridyl)-4-oxo-3-quinolinecarboxylic acid according to claim 5 or a medicinally acceptable salt thereof.

9. 1-Ethyl-1,4-dihydro-6-methyl-7-(2,6-dimethyl-4-pyridyl)-4-oxo-3-quinolinecarboxylic acid according to claim 5 or a medicinally acceptable salt thereof.

10. Pivaloyloxymethyl 1-ethyl-1,4-dihydro-4-oxo-7-(4-pyridyl)-3-quinolinecarboxylate according to claim 6 or a medicinally acceptable salt thereof.

11. Benzoyloxymethyl 1-ethyl-1,4-dihydro-4-oxo-7-(4-pyridyl)-3-quinolinecarboxylate according to claim 6 or a medicinally acceptable salt thereof.

12. 1-Ethyl-1,4-dihydro-7-(2-methyl-5-pyridyl)-4-oxo-3-quinolinecarboxylic acid or a medicinally acceptable salt thereof.

13. 1-Ethyl-7-(2-ethyl-4-pyridyl)-1,4-dihydro-4-oxo-3-quinolinecarboxylic acid or a medicinally acceptable salt thereof.

14. A compound of the formula

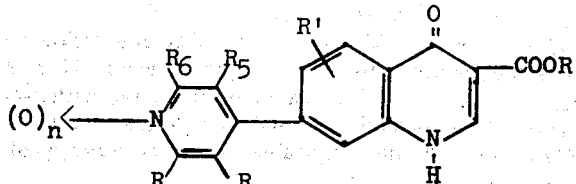

where R is hydrogen or non-tertiary lower-alkyl, R' is halo, non-tertiary lower-alkyl or lower-alkoxy, n is zero or 1, and, $R_2$, $R_3$, $R_5$ and $R_6$ are each hydrogen or from one to four substituents selected from non-tertiary lower-alkyl where $R_3$ and $R_5$ instead of said lower-alkyl each can be lower-carbalkoxy or carboxy where $R_2$ and $R_6$ are each said lower-alkyl, or two of $R_2$, $R_3$, $R_5$ and $R_6$ are each hydrogen and at least one or both of the other two are substituents selected from halo and hydroxy, where the second of said substituents can be replaced by non-tertiary lower-alkyl, where lower in each of lower-alkyl and alkoxy of lower-carbalkoxy designates from one to six carbon atoms.

15. A compound of the formula

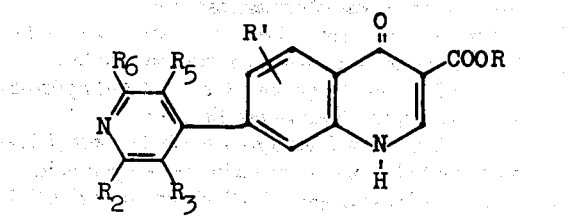

where R is hydrogen or non-tertiary lower-alkyl, R' is halo, non-tertiary lower-alkyl or lower-alkoxy, $R_2$ and $R_6$ are each non-tertiary lower-alkyl, and, $R_3$ and $R_5$ are each carboxy or lower-carbalkoxy, where lower-alkyl, lower-alkoxy or alkoxy of lower-carbalkoxy each has from one to six carbon atoms.

16. A compound of the formula

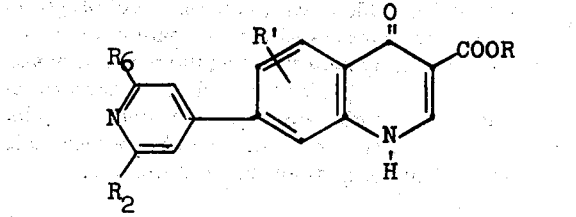

where R is hydrogen or non-tertiary lower-alkyl, R' is halo, non-tertiary lower-alkyl or lower-alkoxy, $R_2$ is hydrogen or non-tertiary lower-alkyl and $R_6$ is hydrogen, non-tertiary lower-alkyl or halo, where lower-alkyl, lower-alkoxy or alkoxy of lower-carbalkoxy each has from one to six carbon atoms.

* * * * *

UNITED STATES PATENT OFFICE
CERTIFICATE OF CORRECTION

PATENT NO. : 3,907,808
DATED : September 23, 1975
INVENTOR(S) : George Y. Lesher and Philip M. Carabateas It is certified that error appears in the above-identified patent and that said Letters Patent are hereby corrected as shown below:

On the face of the patent under "Related U.S. Appliation Data" and between "[63]" and "[52]", insert the following aragraph:

-- The portion of the term of the patent subsequent to August 21, 1990, has been disclaimed. --.

Column 1, line 29, "trataive" should read -- trative --.

Column 4, line 24, "low-" should read -- "low- --, and, line 25, "er-alkyl," should read -- er-alkyl," --.

Column 4, line 68, "$R_1$" should read -- R --.

Column 9, line 2, "orr" should read -- or --.

Column 10, line 26, insert -- methyl-4- -- before 'pyridyl)".

Column 10, line 56, "Klebisiella" should read -- Klebsiella --.

Column 53, line 63, "lower-alkanol" should read -- lower-alkanoyl --.

Column 53, line 68, "of" should read -- or --.

UNITED STATES PATENT OFFICE
CERTIFICATE OF CORRECTION

PATENT NO. : 3,907,808
DATED : September 23, 1975
INVENTOR(S) : George Y. Lesher and Philip M. Carabateas It is certified that error appears in the above-identified patent and that said Letters Patent are hereby corrected as shown below:

Column 54, line 4, "lowercarbalkoxy" should read -- lower-carbalkoxy --.

Column 54, line 15, "lowerhydroxyalkyl" should read -- lower-hydroxyalkyl --.

Column 55, line 30, "nontertiary" should read -- non-tertiary --.

Signed and Sealed this

Twentieth Day of July 1976

[SEAL]

Attest:

RUTH C. MASON
Attesting Officer

C. MARSHALL DANN
Commissioner of Patents and Trademarks